United States Patent
Yoshida

(10) Patent No.: US 10,712,852 B2
(45) Date of Patent: *Jul. 14, 2020

(54) DISPLAY DEVICE WITH POSITION INPUTTING FUNCTION

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,231

(22) Filed: Sep. 7, 2018

(65) Prior Publication Data

US 2019/0079621 A1 Mar. 14, 2019

(30) Foreign Application Priority Data

Sep. 13, 2017 (JP) .................................. 2017-175601

(51) Int. Cl.
| | |
|---|---|
| G06F 3/041 | (2006.01) |
| G02F 1/1362 | (2006.01) |
| G02F 1/1368 | (2006.01) |
| G02F 1/1343 | (2006.01) |
| G06F 3/044 | (2006.01) |
| G02F 1/1333 | (2006.01) |
| G02F 1/136 | (2006.01) |

(52) U.S. Cl.
CPC .......... *G06F 3/0412* (2013.01); *G02F 1/1368* (2013.01); *G02F 1/13338* (2013.01); *G02F 1/134336* (2013.01); *G02F 1/134363* (2013.01); *G02F 1/136286* (2013.01); *G06F 3/044* (2013.01); *G06F 3/0416* (2013.01); *G02F 2001/13606* (2013.01); *G02F 2001/134372* (2013.01); *G02F 2201/121* (2013.01); *G02F 2201/123* (2013.01); *G06F 2203/04111* (2013.01)

(58) Field of Classification Search
CPC ................... G06F 3/0412; G06F 3/044; G06F 2203/04111; G02F 1/13338; G02F 1/134336; G02F 1/134363; G02F 1/136286; G02F 1/1368; G02F 2001/134372; G02F 2001/13606; G02F 2201/121; G02F 2201/123

See application file for complete search history.

(56) References Cited

U.S. PATENT DOCUMENTS 10,088,715 B2 * 10/2018 Yeh .................... G02F 1/134309
10,452,193 B2 * 10/2019 Furutani ............... G06F 3/0412
(Continued)

*Primary Examiner* — Peter D McLoone
(74) *Attorney, Agent, or Firm* — Keating & Bennett, LLP

(57) ABSTRACT

A display device with a position inputting function includes pixel electrodes, signal wirings, position detection electrodes, and a position detection wiring. The signal wirings are configured to transmit signals supplied to the pixel electrode and disposed to sandwich the pixel electrodes. The position detection electrodes are each configured to form capacitors between the position detection electrodes and a position input member and to detect a position of input by the position input member. The position detection wiring includes at least first wiring portions and a second wiring portion. The first wiring portions are each sandwiched between the pixel electrodes and the signal wirings. The second wiring portion bridges the first wiring portions.

10 Claims, 17 Drawing Sheets

(56) References Cited

U.S. PATENT DOCUMENTS

| | | | |
|---|---|---|---|
| 2016/0216802 A1 | 7/2016 | Bao et al. | |
| 2018/0188614 A1* | 7/2018 | Yeh | G02F 1/134309 |
| 2019/0072798 A1* | 3/2019 | Aichi | G06F 3/0416 |
| 2019/0073084 A1* | 3/2019 | Furutani | G06F 3/044 |
| 2019/0079620 A1* | 3/2019 | Yoshida | G06F 3/0412 |
| 2019/0179207 A1* | 6/2019 | Lin | H01L 27/1244 |
| 2019/0227671 A1* | 7/2019 | Hu | G06F 3/0446 |
| 2019/0318702 A1* | 10/2019 | Yoshida | G02F 1/1343 |
| 2019/0319052 A1* | 10/2019 | Yoshida | G02F 1/136259 |

* cited by examiner

DISPLAY DEVICE WITH POSITION INPUTTING FUNCTION

CROSS REFERENCE TO RELATED APPLICATION

This application claims priority from Japanese Patent Application No. 2017-175601 filed on Sep. 13, 2017. The entire contents of the priority application are incorporated herein by reference.

TECHNICAL FIELD

The technology described herein relates to a display device with a position inputting function.

BACKGROUND

A liquid crystal display device that includes an in-cell touchscreen display includes touch electrodes using a self-capacitive method and a touch wiring connected to the touch electrodes through first via holes. Second via holes are formed in sections of the touch electrodes overlapping the first via holes and the touch wiring to which the touch electrodes are connected. An example of such a liquid crystal display device is disclosed in US patent application publication No. 2016/0216802.

In the liquid crystal display device, the second via holes are provided to reduce leak currents from the touch electrodes to a touch wiring to which the touch electrodes are not connected. The liquid crystal display device includes the pixel electrodes and source wirings through which image signals are supplied to the pixel electrodes. The source wirings are disposed to sandwich the pixel electrodes. The touch wiring is sandwiched between one of the source wirings and the pixel electrodes. According to the configuration, parasitic capacitances between the pixel electrodes and the source wiring are different from parasitic capacitances between the pixel electrodes and the other one of the source wirings because the touch wiring is disposed between the pixel electrodes and the source wiring. If image signals with inverted polarities are supplied to the source wirings during column inverting driving, variations in potential of the pixel electrodes are not compensated based on the parasitic capacitances and variations in potential of the source wirings. This may cause display defects such as shadowing.

SUMMARY

The technology described herein was made in view of the above circumstances. An object is to inhibit a reduction in display quality.

A display device with a position inputting function includes pixel electrodes, signal wirings, position detection electrodes, and a position detection wiring. The signal wirings are configured to transmit signals supplied to the pixel electrode and disposed to sandwich the pixel electrodes. The position detection electrodes are each configured to form capacitors between the position detection electrodes and a position input member and to detect a position of input by the position input member. The position detection wiring includes at least first wiring portions and a second wiring portion. The first wiring portions are each sandwiched between the pixel electrodes and the signal wirings. The second wiring portion bridges the first wiring portions.

According to the configuration, the pixel electrodes are charged to potentials based on signals supplied to the pixel electrodes through either one of the signal wirings and image display is performed. The position detection electrodes and the position input member form the capacitors and the position of input by the position input member is detected using the signals supplied through the position detection wiring. The position detection wiring includes the first wiring portions and the second wiring portion that bridges the first ling portions to supply the signals to the position detection electrodes. The pixel electrodes are sandwiched between the signal wirings. Therefore, parasitic capacitances appear between the pixel electrodes and the signal wirings. The parasitic capacitances and variations in potential of the pixel electrodes based on variations in potential of the signal wirings can be compensated by supplying signals with inverted polarities to the signal wirings. The first wiring portions of the position detection wiring are sandwiched between the pixel electrodes and the signal wirings (i.e., first-side first wiring portions among the first wiring portions are sandwiched between the pixel electrodes and one of the first signal wirings and second-side first wiring portions among the first wiring portions are sandwiched between the pixel electrodes and the other one of the first signal wirings). This configuration is preferable for equalizing the parasitic capacitance between the pixel electrodes and one of the signal wirings and the parasitic capacitance between the pixel electrodes and the other one of the signal wirings. Especially, in the configuration in which positional relations of the first-side first wiring portions and one of the signal wirings (distances and wiring widths) relative to the pixel electrodes are about equal to the positional relations of the second-side first wiring portions and the other one of the signal wirings, the above-described configuration is further preferable for equalizing the parasitic capacitances. By supplying the signals with inverted polarities to the signal wirings, the variations in potential of the pixel electrodes due to the variations in potential of one of the signal wirings and the variations in potential of the pixel electrodes due to the variations in potential of the other one of the signal wirings are compensated by the parasitic capacitance that are about equal to each other. Namely, the variations in potential of the pixel electrodes are reduced. Therefore, the reduction in display quality such as shadowing is less likely to occur.

According to the technology described herein, the reduction in display quality can be inhibited.

DETAILED DESCRIPTION

First Embodiment

Figure 1:
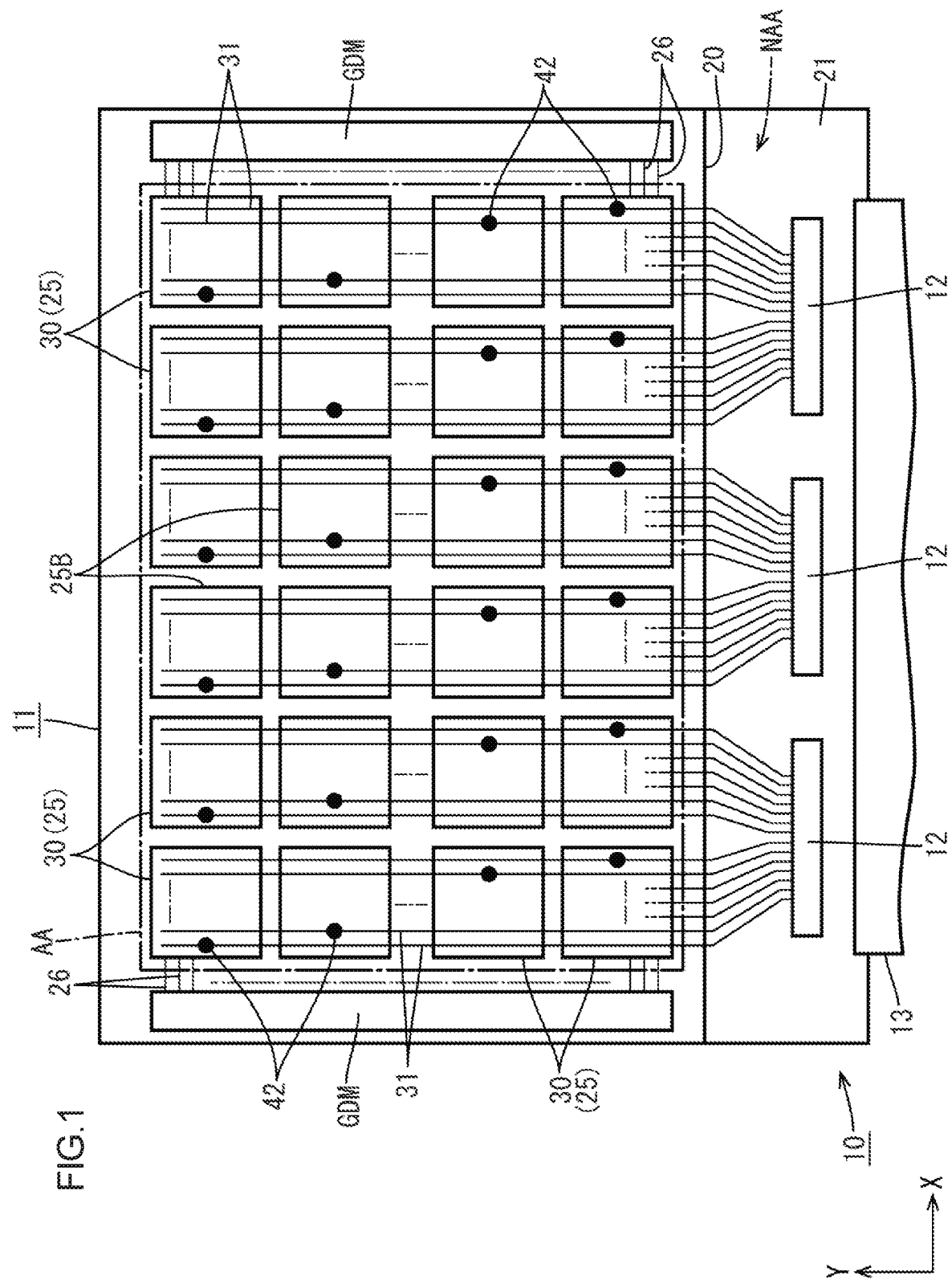
FIG. 1 is a plan view illustrating two-dimensional arrangement of touch electrodes, touch wirings, and source wirings of a liquid crystal panel included in a liquid crystal display device according to a first embodiment.

A first embodiment of the technology described herein will be described with reference to FIGS. 1 to 6. In this section, a liquid crystal display device 10 (a display device with a position input function) will be described. The liquid crystal display device 10 has a touchscreen function (a position inputting function). X-axes, Y-axes, and Z-axes may be present in the drawings. The axes in each drawing correspond to the respective axes in other drawings. An upper side and a lower side in FIGS. 5 and 6 correspond to a front side and a back side of the liquid crystal display device 10, respectively.

As illustrated in FIG. 1, the liquid crystal display device 10 includes at least a liquid crystal panel 11 (a display panel) and a backlight unit (a lighting device). The liquid crystal panel 11 is in a horizontally-long rectangular shape and configured to display images. The backlight unit is an external light source to illuminate the liquid crystal panel 11 for image display. The liquid crystal panel 11 has a screen size of about 32 inches (more precisely, 32.2 inches) and a resolution corresponding to 4K. The backlight unit is disposed behind the liquid crystal panel 11. The backlight unit includes light sources configured to emit white light (e.g., LEDs) and optical members for converting the light from the light sources into planar light by applying optical effects to the light from the light sources. The backlight is not illustrated in the drawings.

As illustrated in FIG. 1, an inner area of the liquid crystal panel 11 is configured as a display area AA in which images are displayed (an area defined by a chain line in FIG. 1). An outer area in a frame shape surrounding the display area AA is configured as a non-display area NAA of the liquid crystal panel 11 in which the images are not displayed. In the non-display area NAA, drivers 12 (driver circuits) and a flexible circuit board 13 (a signal transmitting portion) which are components for supplying various kinds of signals related to a display function and a touchscreen function are mounted. The drivers 12 are LSI chips including driver circuits therein and mounted in the non-display area NAA of the liquid crystal panel 11 through the chip-on-glass (COG) technology. The drivers 12 process the signals transmitted via the flexible circuit board 13. In this embodiment, three drivers 12 are disposed at intervals in the X-axis direction in the non-display area NAA of the liquid crystal panel 11. The flexible circuit board 13 includes a synthetic resin substrate (e.g., polyimide-based resin substrate) having insulating property and flexibility and multiple wirings (not illustrated) formed on the substrate. A first end of the flexible circuit board 13 is connected to the non-display area NAA of the liquid crystal panel 11 and a second end of the flexible circuit board 13 is connected to a control circuit board (a signal source). The signals from the control circuit board are transmitted to the liquid crystal panel 11 via the flexible circuit board 13, processed by the drivers 12 in the non-display area NAA, and output to the display area AA.

Figure 5:
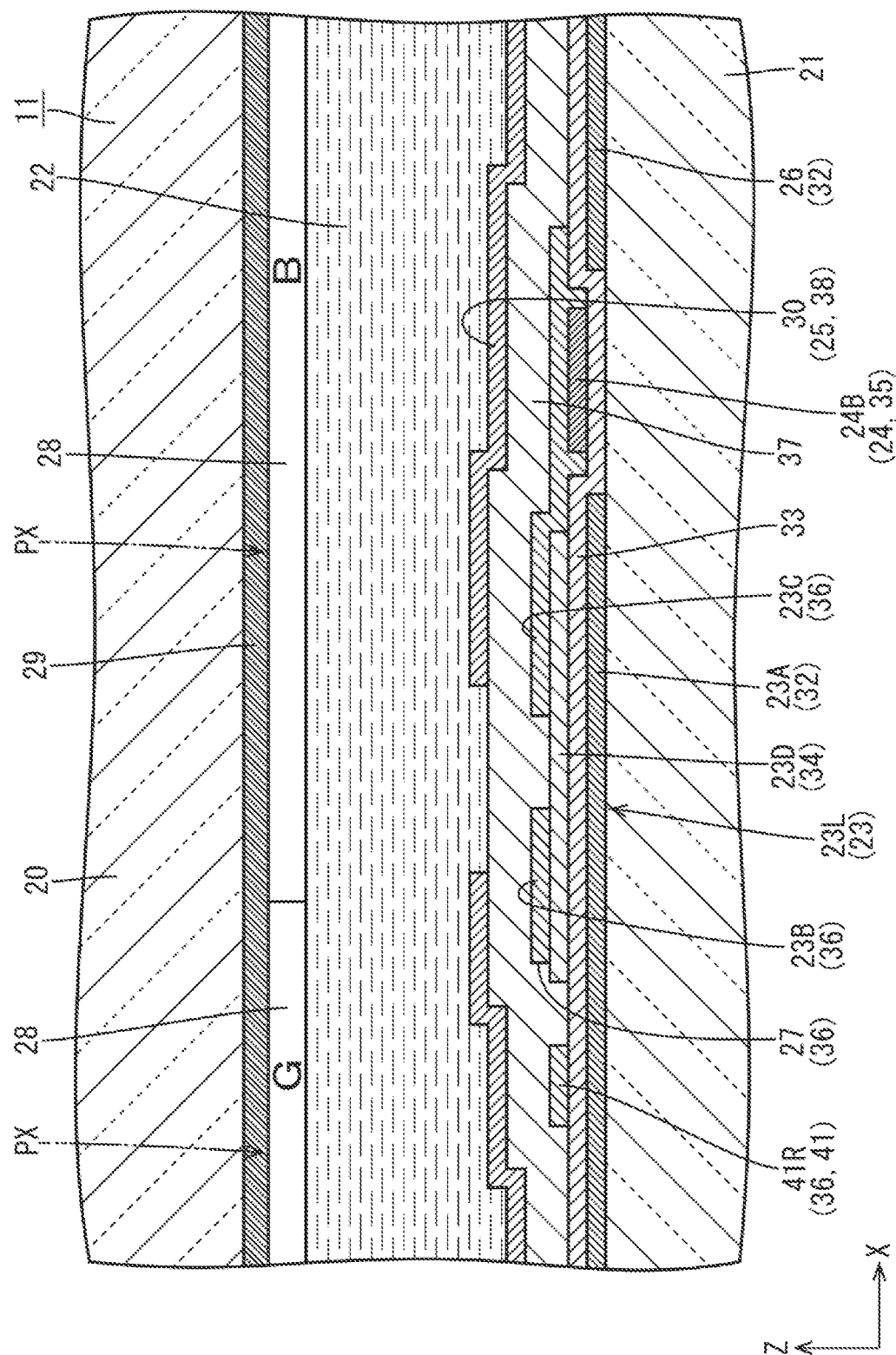
FIG. 5 is a cross-sectional view along line A-A in FIG. 2.

The liquid crystal panel 11 will be described in detail. As illustrated in FIG. 5, the liquid crystal panel 11 includes a pair of substrates 20 and 21 and a liquid crystal layer 22 (a medium layer) between the substrates 20 and 21. The liquid crystal layer 22 contains liquid crystal molecules that are substances having optical characteristics that change according to application of an electric field. The liquid crystal layer 22 is surrounded by a sealing member, which is not illustrated, disposed between the substrates 20 and 21. The liquid crystal layer 22 is sealed by the sealing member. One of the substrates 20 and 21 on the front side is the CF substrate 20 (a common substrate) and the other on the rear side (back side) is the array substrate 21 (an active matrix substrate, a component substrate). The CF substrate 20 and the array substrate 21 include substantially transparent glass substrates and various films formed in layers on the glass substrates. Polarizing plates (not illustrated) are attached to outer surfaces of the substrates 20 and 21.

Figure 2:
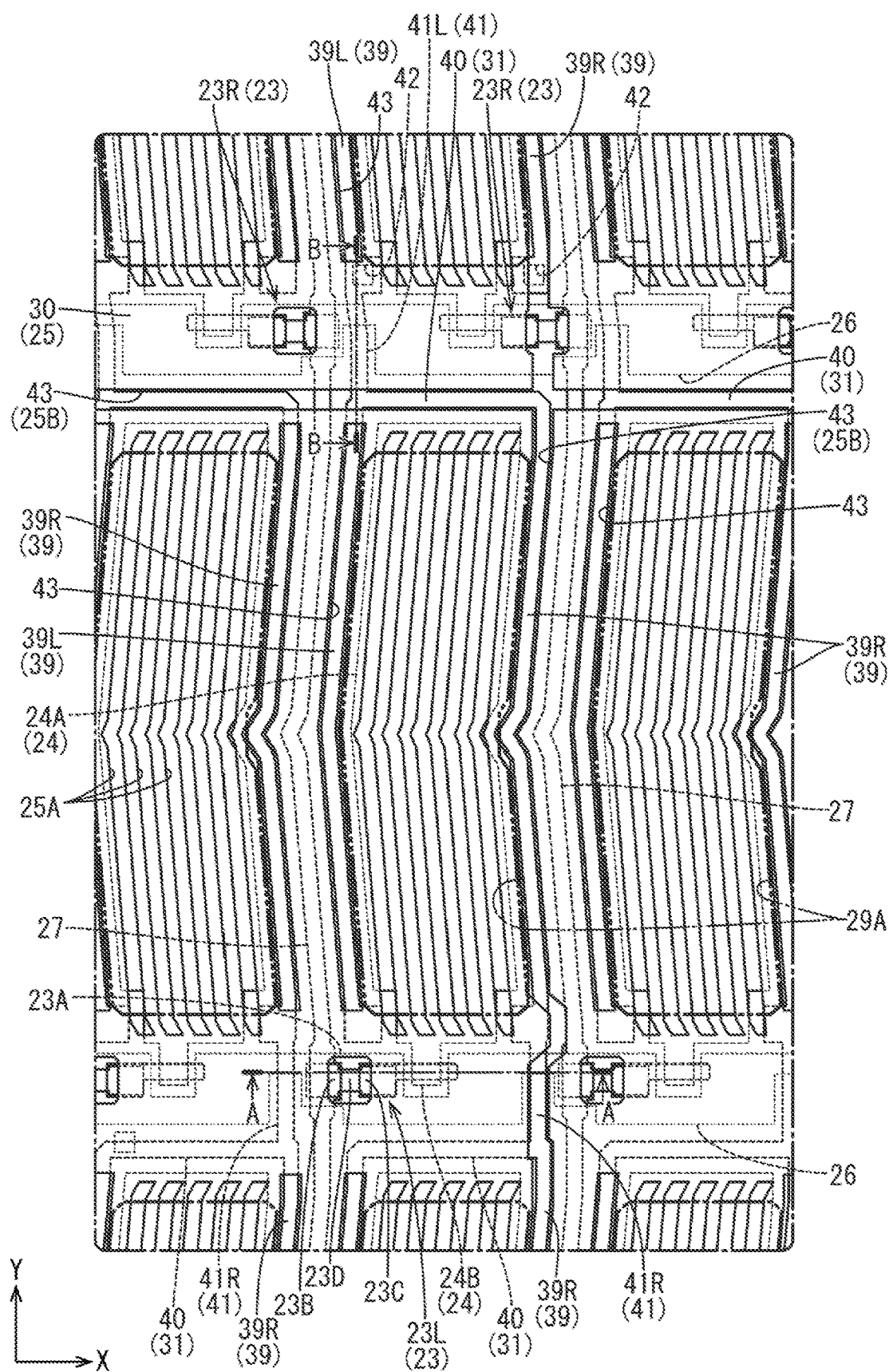
FIG. 2 is a plan view illustrating arrangements of pixels on an array substrate and a CF substrate included in the liquid crystal panel.

As illustrated in FIG. 2, thin film transistors 23 (TFTs, switching components) and pixel electrodes 24 are arranged in a matrix in an area of an inner surface of the array substrate 21 (on a liquid crystal layer 22 side, on an opposed surface side opposed to the CF substrate 20) in the display area AA. Lines of the TFTs 23 and lines of the pixel electrodes 24 are arranged along the X-axis direction (a first direction in which the pixel electrodes 24 and the touch wirings 31 are arranged) and the Y-axis direction (a second direction). Gate wirings 26 (scanning lines) and source wirings 27 (signal lines, data lines) are routed perpendicular to each other to surround the TFTs 23 and the pixel electrodes 24. The gate wirings 26 extend in a direction substantially along the X-axis direction. The source wirings 27 extend in a direction substantially along the Y-axis direction. The gate wirings 26 are connected to gate electrodes 23A of the TFTs 23. The source wirings 27 are connected to source electrodes 23B of the TFTs 23. The pixel electrodes 24 are connected to drain electrodes 23C of the TFTs 23. The TFTs 23 are driven based on various kinds of signals supplied to the gate wirings 26 and the source wirings 27. Through the driving of the TFTs 23, application of voltages to the pixel electrodes 24 is controlled. Each pixel electrode 24 has a vertically-long rectangular shape in a plan view (more specifically, long sides are bent along the source wirings 27). A short direction of each pixel electrode 24 corresponds with a direction in which the gate wirings 26 extend. A long direction of each pixel electrode 24 corresponds with a direction in which the source wirings 27 extend. Each pixel electrodes 24 is sandwiched between the gate wirings 26 with respect to the Y-axis direction and between the source wirings 27 with respect to the X-axis direction. Arrangements of the TFTs 23, the pixel electrodes 24, the gate wirings 26, and the source wirings 27 will be described later. As illustrated in FIG. 1, gate driver monolithic circuits GDM for supplying scan signals to the gate wirings 26 are disposed in the non-display area NAA of the array substrate 21.

As illustrated in FIG. 5, a common electrode 25 is formed to overlap all pixel electrodes 24 on an upper layer side relative to the pixel electrodes 24 (closer to the liquid crystal layer 22) in the display area AA on an inner surface side of the array substrate 21. The common electrode 25 spreads over substantially an entire area of the display area AA to apply a reference voltage that is normally about constant. The common electrode 25 includes pixel overlapping openings 25A (pixel overlapping slits, alignment control slits) are formed in areas overlapping the pixel electrodes (specifically, pixel electrode bodies 24A, which will be described later). The pixel overlapping openings 25A extend in a longitudinal direction of the pixel electrodes 24. When a potential difference occurs between the pixel electrode 24 and the common electrode 25 that overlap each other as the pixel electrode 24 is charged, a fringe electric field (an oblique electric field) is generated between an opening edge of the pixel overlapping opening 25A and the pixel electrode 24. The fringe electric field includes a component parallel to the plate surface of the array substrate 21 and a component normal to the plate surface of the array substrate 21. With the fringe electric field, orientations of the liquid crystal molecules included in the liquid crystal layer 22 can be controlled. Namely, the liquid crystal panel 11 according to this embodiment operates in fringe field switching (FFS) mode. The number and the shape of the pixel overlapping openings 25A and areas in which the pixel overlapping openings 25A can be altered from those in the drawings where appropriate.

As illustrated in FIG. 5, color filters 28 that exhibit three different colors of blue (B), green (G), and red (R) are disposed in the display area AA on the inner surface side of the CF substrate 20. The color filters 28 that exhibit different colors are repeatedly arranged along the gate wirings 26 (in the X-axis direction) and the color filters 28 are arranged in lines along the source wirings 27 (substantially the Y-axis direction). Namely, the color filters 28 are arranged in a stripe as a whole. The color filters 28 are arranged to overlap the pixel electrodes 24 on the array substrate 21, respectively, in a plan view. The color filters 28 that are adjacent to each other in the X-axis direction and exhibit different colors each other are arranged such that a boundary therebetween (a color boundary) overlap the source wiring 27 and a light blocking portion 29. In the liquid crystal panel 11, the R, the G, and the B color filters that are arranged along the X-axis direction and three pixel electrodes 24 opposed to the respective color filters 28 compose three colors of pixels PX. In the liquid crystal panel 11, the R, the G, and the B pixels PX that are adjacent to one another in the X-axis direction form a display pixel configured to perform color display in predefined tones. An interval of the pixels PX in the X-axis direction is about 60 μm (specifically, 62 μm). An interval of those in the Y-axis direction is about 180 μm (specifically, 186 μm).

As illustrated in FIGS. 2 and 5, the light blocking portion 29 (an inter-pixel portion, a black matrix) configured to block light is formed in the display area AA on the inner surface side of the CF substrate 20. The light blocking portion 29 is formed in a grid pattern in a plan view to separate the adjacent pixels PX (the pixel electrodes 24).

The light blocking portion 29 includes pixel openings 29A at positions overlapping large areas of the pixel electrodes 24 on the array substrate 21 side in a plan view. The pixel openings 29A are arranged in a matrix within the plate surface of the CF substrate 20. The numbers of the pixel openings 29A are arranged in the X-axis direction and the Y-axis direction. Each pixel opening 29A has a vertically-long rectangular two-dimensional shape along an outline of the pixel electrode 24. The pixel openings 29A pass light therethrough for display at the pixels PX. The light blocking portion 29 restricts light from traveling between the adjacent pixels PX to ensure independency of tones of each pixel PX. Especially, sections of the light blocking portion 29 extending along the source wirings 27 reduce color mixture between the pixels PX that exhibit different colors. The light blocking portion 29 overlaps at least the gate wirings 26 and the source wirings 27 (including touch wirings 31, which will be described later) on the array substrate 21 in a plan view. A planarization film (not illustrated) is formed in a solid pattern over the color filters 28 (on a liquid crystal layer 22 side) on an entire area of the CF substrate 20. Alignment films (not illustrated) for orienting the liquid crystal molecules in the liquid crystal layer 22 are formed on innermost surfaces of the substrates 20 and 21 in contact with the liquid crystal layer 22.

The liquid crystal panel 11 according to this embodiment has a display function for displaying images and a touch-screen function (a position input function) for detecting positions of input by a user performs based on displayed images (input positions). The liquid crystal panel 11 includes an integrated touchscreen pattern (with an in-cell technology) for exerting the touchscreen function. The touchscreen pattern uses so-called a projection type electrostatic capacitance method. A self-capacitance method is used for detection. As illustrated in FIG. 1, the touchscreen pattern includes touch electrodes 30 (position detection electrodes) are disposed on the array substrate 21 of the pair of substrates 20 and 21 and arranged in a matrix within the plate surface of the array substrate 21. The touch electrodes 30 are disposed in the display area AA of the array substrate 21. The display area AA of the liquid crystal panel 11 substantially corresponds with a touch area in which input positions are detectable (a position input area). The non-display area NAA substantially corresponds with a non-touch area in which input positions are not detectable (a non-position input area). When the user intends to input a position based on a displayed image in the display area AA of the liquid crystal panel 11 recognized by the user and brings his or her finger (a position input body), which is a conductive member but not illustrated, closer to the surface of the liquid crystal panel 11 (a display surface), a capacitance appears between the finger and the touch electrode 30. The capacitance measured at the touch electrode 30 close to the finger changes as the finger approaches to the touch electrode 30. The capacitance at the touch electrode 30 is different from the capacitance at the touch electrodes 30 farther from the finger. Based on the difference, the input position can be detected.

As illustrated in FIG. 1, the touch electrodes 30 are constructed from the common electrode 25 on the array substrate 21. The common electrode 25 includes a void 25B (separating slits) in addition to the pixel overlapping openings 25A that are described earlier. The void 25B separates the adjacent touch electrodes 30 from each other. The void 25B includes horizontal sections that extend all the way across the common electrode 25 in the X-axis direction and vertical sections that extend all the way across the common electrode in the Y-axis direction. The void 25B has a substantially grid shape as a whole in a plan view. The common electrode 25 is composed of the touch electrodes 30 that are divided by the void 25B to form a grid and electrically independent from one another. The touch electrodes 30 that are provided by dividing the common electrode 25 by the void 25B are arranged in a matrix including lines of the touch electrodes 30 along the X-axis direction and the Y-axis direction in the display area AA. Each touch electrode 30 has a substantially square shape in a plan view with about some millimeters (e.g., two to four millimeters) on a side. Each touch electrode 30 is significantly larger than the pixel PX (or the pixel electrode 24) in the plan view. Each touch electrode 30 is disposed in an area that covers multiple (e.g., several tens or hundreds of) pixels PX with respect to the X-axis direction and the Y-axis direction. Multiple touch wirings 31 (the position detection lines) on the array substrate 21 are selectively connected to the touch electrodes 30. The touch wirings 31 extend parallel to the source wirings 27 and substantially along the Y-axis direction. The touch wirings 31 are connected to specific ones of the touch electrodes 30 that are arranged along the Y-axis direction. The touch wirings 31 are connected to detection circuits that are not illustrated. The detection circuits may be included in the drivers 12 or may be provided outside the liquid crystal panel 11 and connected via the flexible circuit board 13. The touch wirings 31 supply reference voltage signals related to the image display function and touch signals (position detection signals) related to the touch function to the touch electrodes 30 at different timing. When the reference voltage signals are transmitted to all the touch wirings 31 at the same time, all the touch electrodes 30 are at the reference potential and function as the common electrode 25. FIG. 1 schematically illustrates the arrangement of the touch electrodes 30. The number, the arrangement, and the two-dimensional shape of the touch electrodes 30 may be altered from those in the drawings where appropriate.

Films formed in layers on the inner surface of the array substrate 21 will be described. As illustrated in FIG. 5, on the array substrate 21, a first metal film 32, a gate insulating film 33, a semiconductor film 34, a first transparent electrode film 35 (a conductor film, a transparent electrode film), a second metal film 36 (a conductor film, a metal film), an interlayer insulating film (an insulating film, a transparent interlayer insulating film), and a second transparent electrode film 38 are formed in layers in this sequence from a lower layer side (on a glass substrate side) on the array substrate 21. Each of the first metal film 32 and the second metal film 36 is a single layer film made of one kind of metal selected from copper, titanium, aluminum, molybdenum, and tungsten. Alternatively, each of the first metal film 32 and the second metal film 36 is a laminated film made of different kinds of metals or alloy. The first metal film 32 and the second metal film 36 have conductivity and light blocking properties. The gate wirings 26 and the gate electrodes 23A of the TFTs 23 first metal film 32 are constructed from the first metal film 32. The source wirings 27, the touch wirings 31, and the source electrodes 23B and the drain electrodes 23C of the TFTs 23 are constructed from the second metal film 36. The gate insulating film 33 and the interlayer inter-layer insulating film 37 are made of non-organic material such as silicon nitride and silicon oxide. The gate insulating film 33 insulates the first metal film 32 on the lower layer side from the semiconductor film 34, the first transparent electrode film 35, and the second metal film 36 on the upper layer side. The inter-layer insulating film 37 insulates the semiconductor film 34, the first transparent electrode film 35, and the second metal film 36 on the lower layer side from the second transparent electrode film 38 on the upper layer side. The semiconductor film 34 is a thin film made of oxide semiconductor or amorphous silicon. The semiconductor film 34 forms channels 23D (semiconductor portions of the TFTs 23 connected to the source electrodes 23B and the drain electrodes 23C. The first transparent electrode film 35 and the second transparent electrode film 38 are made of transparent electrode material (e.g., indium tin oxide (ITO), indium zinc oxide (IZO)). The first transparent electrode film 35 forms at least the pixel electrodes 24. The second transparent electrode film 38 forms at least the common electrode 25 (the touch electrodes 30) (see FIG. 4).

Figure 3:
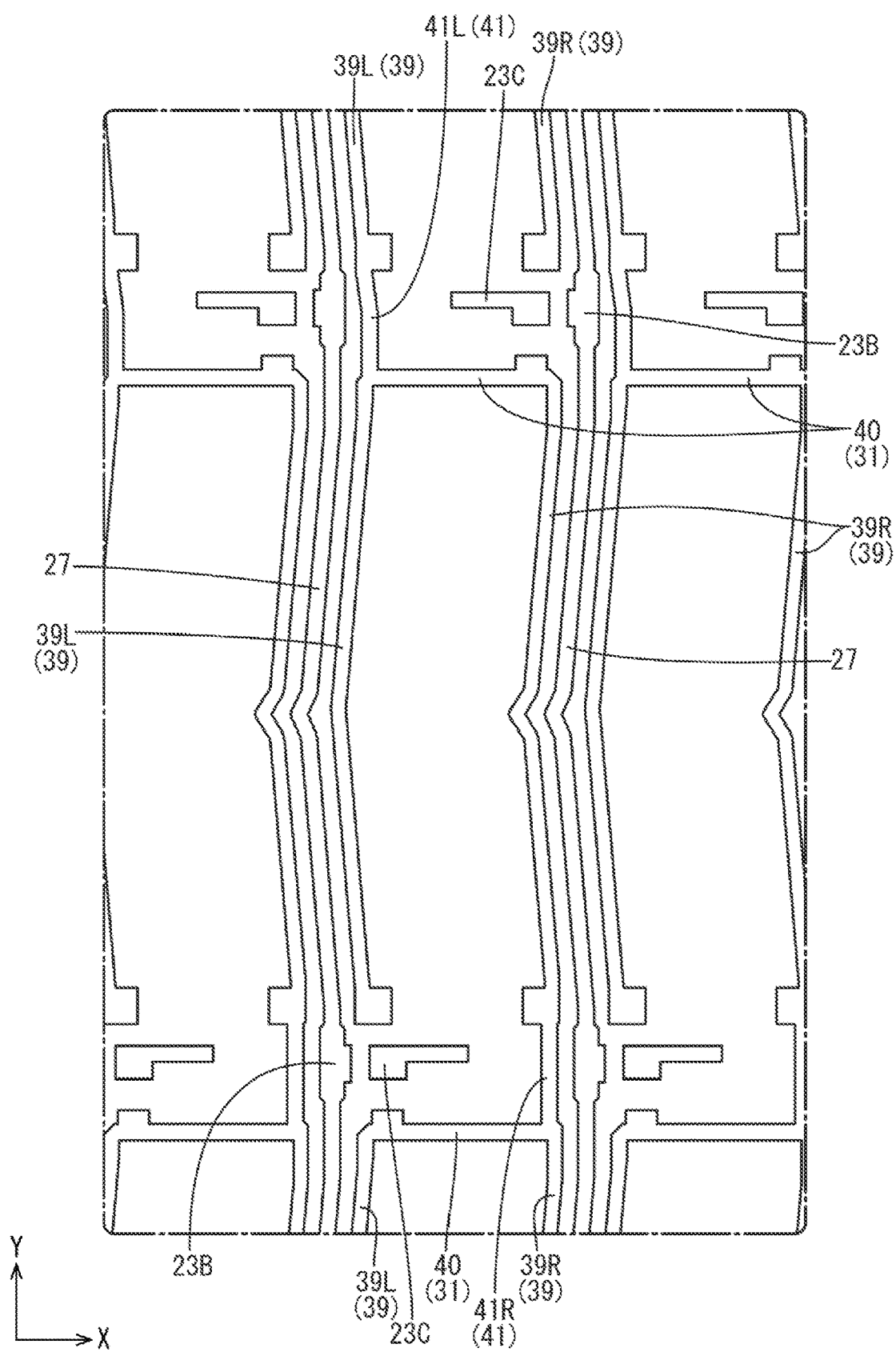
FIG. 3 is a plan view illustrating a second metal film pattern on the array substrate included in the liquid crystal panel.

The configurations of the TFTs 23 and the pixel electrodes 24 will be described in detail. As illustrated in FIG. 2, each TFT 23 has a horizontally-elongated shape that extends along the X-axis direction as a whole. Each TFT 23 is disposed immediately below the pixel electrode 24 to be connected with respect the Y-axis direction in FIG. 2. Each TFT 23 includes the gate electrode 23A that is a portion of the gate wiring 26 (a portion overlapping at least the source wiring 27). The gate electrode 23A has a horizontally-elongated shape that extends along the X-axis direction. The TFT 23 is driven based on scanning signals supplied to the gate wiring 26 and thus a current between the source electrode 23B and the drain electrode 23C is controlled. As illustrated in FIGS. 2 and 3, the TFT 23 includes the source electrode 23B that is a portion of the source wiring 27 (a portion overlapping the gate wiring 26). The source electrode 23B is disposed at a first end of the TFT 23 with respect to the X-axis direction such that about an entire area of the source electrode 23B overlaps the gate electrode 23A. The source electrode 23B is connected to the channel 23D. The TFT 23 includes the drain electrode 23C disposed at a position separated from the source electrode 23B, that is, a second end of the TFT 23 with respect to the X-axis direction. The drain electrode 23C extends substantially along the X-axis direction. A first end of the drain electrode 23C is opposed to the source electrode 23B and overlaps the gate electrode 23A. The first end of the drain electrode 23C is connected to the channel 23D. The second end is connected to the pixel electrode 24. In this embodiment, the source electrode 23B and the drain electrode 23C have single layer structures constructed from the second metal film 36. However, the source electrode 23B and the drain electrode 23C may be configured as laminated structures of the first transparent electrode film 35 and the second metal film 36.

As illustrated in FIG. 2, the pixel electrodes 24 include pixel electrode bodies 24A and the contact portions 24B. Each pixel electrode body 24A has a substantially square shape overlapping the corresponding pixel opening 29A of the light blocking portion 29. Each contact portion 24B protrudes from the pixel electrode body 24A in the Y-axis direction toward the FTT 23 side. The contact portions 24B are connected to the second ends of the drain electrodes 23C. Sections of the gate wirings 26 overlapping the contact portions 24B and the drain electrodes 23C are cut out. Cutouts of the gate wirings 26 are provided to reduce the capacitances between the gate wirings 26 and the pixel electrodes 24. The second ends of the drain electrodes 23C overlap the gate wirings 26. In the production of the array substrate 21, even if the drain electrodes 23C are displaced relative to the gate wirings 26, the capacitances between the gate wirings 26 and the drain electrodes 23C (namely, the pixel electrodes 24) are less likely to vary. The TFTs 23 include the channels 23D that overlap the gate electrodes 23A via the gate insulating film 33. The channels 23D are connected to the source electrodes 23B and the drain electrodes 23C. The channels 23D overlap the gate electrodes 23A and extend along the X-axis direction. First ends of the channels 23D are connected to the source electrodes 23B and second ends of the channels 23D are connected to the drain electrodes 23C. When the TFTs 23 are turned on according to the scanning signals supplied to the gate electrodes 23A, image signals (single, data signals) supplied to the source wirings 27 are transmitted from the source electrodes 23B to the drain electrodes 23C via the channels 23D that are constructed from the semiconductor film 34. As a result, the pixel electrodes 24 are charged to potentials based on the image signals. Sections of the common electrode 25 overlapping the channels 23D are cut out. The cutouts of the common electrode 25 are provided for reducing variations in leak current between the source electrodes 23B and the drain electrodes 23C according to variations in potential of the common electrode 25 (the touch electrodes 30) when the TFTs 23 are turned off.

As illustrated in FIG. 2, the TFTs 23 disposed in the display area AA of the array substrate 21 include first TFTs 23R (first switching components) and second TFTs 23L (second switching components). The TFTs 23R are located on the right side (the first end side) relative to the pixel electrodes 24 with respect to the X-axis direction in FIG. 2. The second TFTs 23L are located closer to the left side (the second end side) relative to the pixel electrodes 24 with respect to the X-axis direction in FIG. 2. Hereinafter, when the TFTs 23 on the right side and the TFTs 23 on the left side in FIG. 2 are distinguished from each other, the TFTs 23 on the right side will be referred to as the first TFTs with reference symbol 23R and the TFTs 23 on the left side will be referred to as the second TFTs with reference symbol 23L. When they are not distinguished from each other, they are referred to as the TFTs with reference symbol 23. The first TFTs 23R and the second TFTs 23L are disposed to sandwich the pixel electrodes 24 from sides with respect to the Y-axis direction. The first TFTs 23R and the second TFTs 23L are alternately arranged with respect to the Y-axis direction, that is, arrangement in a zigzag manner in a plan view. The first TFTs 23R and the second TFTs 23L are disposed such that the source electrodes 23B and the drain electrodes 23C of the first TFTs 23R and the second TFTs 23L are the other way around with respect to the X-axis direction. The first TFTs 23R are connected to the source wirings 27 on the right side in FIG. 2 among the source wirings 27 that sandwich the pixel electrodes 24 from the sides with respect to the X-axis direction. The second TFTs 23L are connected to the source wirings 27 on the left side in FIG. 2. The first TFTs 23R are adjacent to the pixel electrodes 24 in the middle in FIG. 2 and the pixel electrodes 24 at the uppermost in FIG. 2 with respect to the Y-axis direction. The first TFTs 23R are connected to the pixel electrodes 24 at the uppermost in FIG. 2. The second TFTs 23L are connected to the pixel electrodes 24 in the middle in FIG. 2. According to the configuration, the pixel electrodes 24 that are adjacent with respect to the Y-axis direction and located at the uppermost in FIG. 2 are charged to the predefined potentials when the first TFTs 23R connected to the pixel electrodes 24 are driven and the signals transmitted to the source wirings 27 on the right side in FIG. 2 among the source wirings 27 are supplied to the pixel electrodes 24 at the uppermost. The pixel electrodes 24 in the middle in FIG. 2, which are the other pixel electrodes 24 adjacent with respect to the Y-axis direction, are charged to the predefined potentials when the second TFTs 23L connected to the pixel electrodes 24 are driven and the signals transmitted to the source wirings 27 on the left side in FIG. 2 are supplied to the pixel electrodes 24 in the middle. The signals transmitted to the different source wirings 27 are supplied to the pixel electrodes 24 adjacent with respect to the Y-axis direction. This is preferable for arranging pixels with polarities in the same manner as pixels in dot inverting driving to drive the pixels with lower power consumption.

Next, the configuration of the touch wirings 31 will be described in detail. As illustrated in FIGS. 2 and 3, each touch wiring 31 includes at least pairs of first wiring portions 39 and second wiring portions 40. The first wiring portions 39 in each pair sandwich the corresponding pixel electrode 24 from sides with respect to the X-axis direction. Each second wiring portion 40 bridges the first wiring portions 39 in the corresponding pair. The first wiring portions 39 in each pair are disposed in areas between the pixel electrode 24 and the source wirings 27 that sandwich the pixel electrode 24 from the sides with respect to the X-axis direction. The first wiring portions 39 in each pair are parallel to edges of the pixel electrode 24 and the source wirings in the corresponding pair. The first wiring portions 39 extend substantially along the Y-axis direction and have a length about equal to a long dimension of the pixel electrode 24. Each second wiring portion 40 is disposed to connect one of ends of one of the first wiring portions 39 on the upper side in FIGS. 2 and 3 to one of ends of the other first wiring portion 39 on the upper side in FIGS. 2 and 3. Namely, the second wiring portion 40 connects the ends of the wiring portions 39 on opposite side from the TFT 23 together. The second wiring portions 40 extend substantially straight along the X-axis direction and have a length about equal to a short dimension of the pixel electrodes 24. Each pair of the first wiring portions 39 and the corresponding second wiring portions 40 of the touch wirings 31 are disposed outer and along the three edges of the corresponding pixel electrode 24 other than the edge on the TFT 23 side.

The touch wirings 31 are composed of pairs of the first wiring portions 39 and the second wiring portions 40 that bridge the first wiring portions 39 in the corresponding pairs. The first wiring portions 39 in each pair are disposed in the areas between the pixel electrode 24 and the source wirings 27 in the corresponding pair. This configuration is preferable for equalizing a parasitic capacitance between the pixel electrode 24 and one of the source wirings 27 to a parasitic capacitance between the pixel electrode 24 and the other one of the source wirings 27. By supplying signals with opposite polarities to the source wirings 27 that sandwich the pixel electrode 24 from the sides with respect to the X-axis direction, respectively, a variation in potential of the pixel electrode 24 according to a variation in potential of one of the source wirings 27 and a variation in potential of the pixel electrode 24 according to a variation in potential of the other one of the source wirings 27 are compensated because of the parasitic capacitances that are about equal to each other. Namely, when the TFT 23 is in an off state, the variation in potential of the pixel electrode 24 is reduced. According to the configuration, a reduction in display quality such as shadowing is less likely to occur.

As illustrated in FIGS. 2 and 3, the pairs (the number of the pairs equal to the number of the pixel electrodes 24 linearly arranged in the Y-axis direction) of the first wiring portions 39 of the touch wirings 31 are linearly arranged in the Y-axis direction. The touch wirings 31 include third wiring portions 41 each connecting the first wiring portions 39 that are adjacent to each other in the Y-axis direction together. The first wiring portions 39, the second wiring portions 40, and the third wiring portions 41 of the touch wirings 31 are constructed from the second metal film 36. The third wiring portions 41 are disposed not to overlap the TFTs 23 to protect the touch wirings 31 and the TFTs 23 from forming short circuits. Because the first wiring portions 39 that are adjacent to each other in the Y-axis direction are connected with the third wiring portions 41, the touch wirings 31 extend along the Y-axis direction to cross the pixel electrodes 24. Because not only the first wiring portions 39 and the second wiring portions 40 but also the third wiring portions 41 are constructed from the second metal film 36, wire resistances of the touch wirings 31 can be reduced in comparison to a configuration in which the first wiring portions 39 that are adjacent to each other in the Y-axis direction are connected by the third wiring portions that are constructed from the transparent electrode film disposed in a different layer from the layer of the first wiring portions 39. Hereinafter, when one of the first wiring portions 39 in each pair sandwiching the corresponding pixel electrode 24 with respect to the X-axis direction on the right side and the other one of the first wiring portions on the left side in FIG. 2 are distinguished from each other, the first wiring portion 39 on the right side will be referred to as first-side first wiring portions with reference symbol 39R and the first wiring portion 39 on the left side will be referred to as second-side first wiring portions with reference symbol 39L. When they are not distinguished from each other, they are referred to as the first wiring portions with reference symbol 39.

Specifically, as illustrated in FIGS. 2 and 3, the third wiring portions 41 include first-side third wiring portions 41R and second-side third wiring portions 41L. Each first-side third wiring portion 41R connects one of the first-side first wiring portions 39R that are adjacent to each other in the Y-axis direction to the other one of the first-side first wiring portions 39R. Each second-side third wiring portion 41L connects one of the second-side first wiring portions 39L that are adjacent to each other in the Y-axis direction to the other one of the second-side first wiring portions 39L. Hereinafter, when the third wiring portions 41 connected to the first-side first wiring portions 39R and the third wiring portions 41 connected to the second-side first wiring portions 39L are distinguished from each other, the former will be referred to as first-side third wiring portions with reference symbol 41R and the later will be referred to as second-side third wiring portions with reference symbol 41L. When they are not distinguished from each other, they are referred to as the third wiring portions with reference symbol 41. The first-side third wiring portions 41R are located on the right side in FIG. 2 relative to the pixel electrodes 24 with respect to the X-axis direction. The first-side third wiring portions 41R do not overlap the second TFTs 23L located on the left side. The second-side third wiring portions 41L are located on the left side in FIG. 2 relative to the pixel electrodes 24 with respect to the X-axis direction. The second-side third wiring portions 41L do not overlap the first TFTs 23R located on the right side. The first-side third wiring portions 41R and the second-side third wiring portions 41L are alternately arranged in the Y-axis direction to cover areas in which the TFTs 23 are not disposed. The first-side third wiring portions 41R and the second-side third wiring portions 41L arranged in a zigzag manner in the plan view. The third wiring portions 41 are disposed in areas in which the TFTs 23 are not disposed as if to fill the areas.

As described above, the touch wirings 31 are constructed from the second metal film 36, that is, in the same layer as the source wirings 27. In comparison to a configuration in which the source wirings and the touch wirings are disposed in different layers separated by an insulating film, this configuration is preferable for reducing a production cost. Furthermore, the second metal film 36 that forms the source wirings 27 and the touch wirings 31 and the first transparent electrode film 35 are disposed in upper layers relative to the gate insulating film 33. Namely, the source wirings 27 and the touch wirings 31 are disposed in the same layer as the pixel electrodes 24. In comparison to a configuration in which the pixel electrodes are disposed in a layer separated from a layer in which the source wirings 27 and the touch wirings 31 are disposed by an insulating film, parasitic capacitances between the pixel electrodes 24 and the source wirings 27 are larger. Whether the touch wirings 31 are disposed between the pixel electrodes 24 and the source wirings 27 is more likely to be a problem. Therefore, a reduction in display quality is more likely to occur. According to the configuration in which the first wiring portions 39 of the touch wirings 31 are sandwiched between the source wirings 27 and the pixel electrodes 24, the parasitic capacitances are equalized. This configuration is preferable for reducing occurrence of the reduction in display quality. Furthermore, this configuration is preferable for further reducing the production cost.

Figure 6:
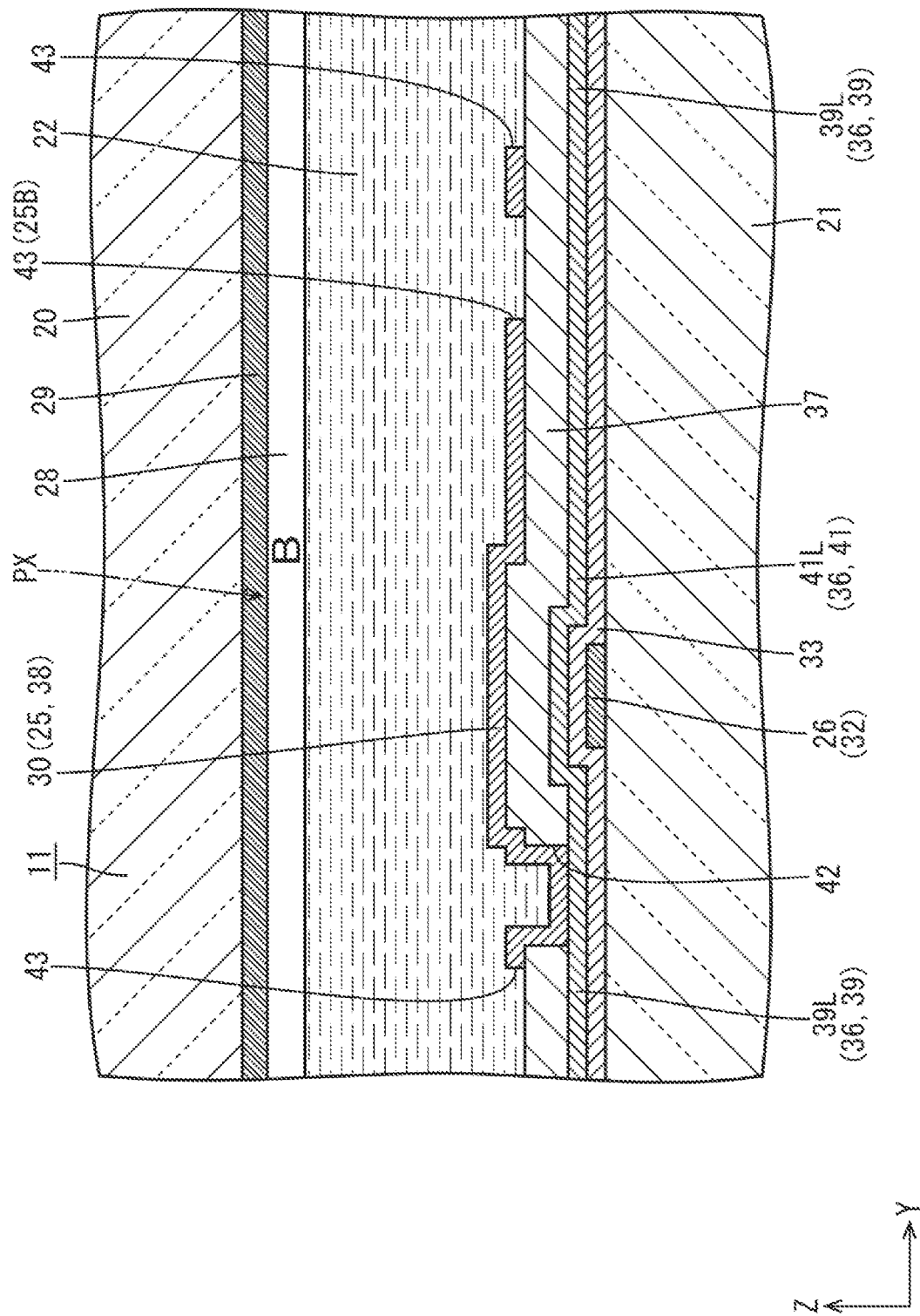
FIG. 6 is a cross-sectional view along line B-B in FIG. 2.

A connecting structure of the touch electrodes 30 and the touch wirings 31 will be described. As illustrated in FIGS. 2 and 6, the touch wirings 31 are connected to the corresponding touch electrodes 30 via touch contact holes 42 (position detection contact holes) formed in the interlayer insulating film 37. The touch wirings 31 extend substantially in the Y-axis direction to horizontally cross all the touch electrodes 30. The touch wirings 31 are selectively connected to the touch electrodes 30 specified based on the two-dimensional arrangement of the touch contact holes 42. The touch contact holes 42 in this embodiment are arranged at positions overlapping connecting points of the touch wirings 31 with the second-side first wiring portions 39 and the second-side third wiring portions 41L or positions overlapping ends of the first-side first wiring portions 39R on the first TFTs 23R side.

Figure 4:
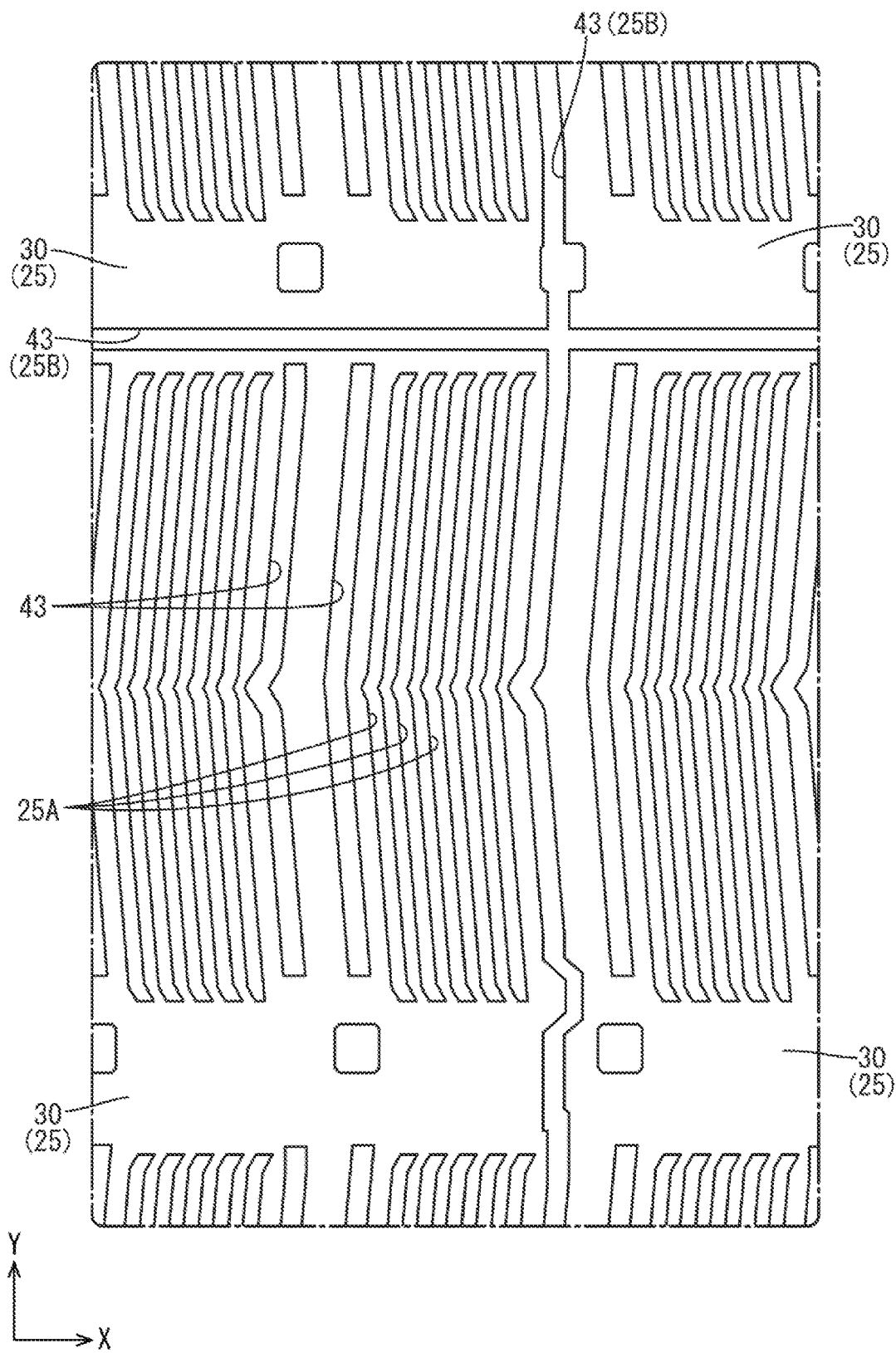
FIG. 4 is a plan view illustrating a second transparent electrode film pattern on the array substrate included in the liquid crystal panel.

As illustrated in FIGS. 2 and 4, the touch electrodes 30 (the common electrode 25) constructed from the second transparent electrode film 38 include touch wiring overlapping openings 43 (position detection wirings overlapping openings) at positions overlapping at least sections of the touch wirings 31. The touch wiring overlapping openings 43 extend parallel to the Y-axis direction corresponding with the direction in which the touch wirings 31 extend. Each touch wiring overlapping opening 43 has a vertically elongated shape (an elongated shape with a long dimension in the direction in which the touch wirings 31 extend) in the plan view. Each touch wiring overlapping opening 43 has a width (a dimension in the X-axis direction) greater than a width of each touch wiring 31 and about equal to a width of each pixel overlapping opening 25A of the common electrode 25. With the touch wiring overlapping openings 43 disposed to overlap at least the sections of the touch wirings 31, parasitic capacitances between the touch wirings 31 and the touch electrodes 30 that are not connected to the touch wirings are reduced. Therefore, proper sensitivities in position detection can be achieved. Specifically, the touch wiring overlapping openings 43 (except for the void 25B, which will be described later) overlap large areas of the first wiring portions 39 of the touch wirings 31. A length of each touch wiring overlapping opening 43 (a dimension in the Y-axis direction) is less than a length of each first wiring portion 39. Furthermore, sections of the void 25B in the common electrode 25 which separate the adjacent touch electrodes 30 from each other function as touch wiring overlapping openings 43. Namely, the sections of the void 25B extending along the Y-axis direction overlap the touch wirings 31. Specifically, the sections of the void 25B extending along the Y-axis direction overlap the first-side first wiring portions 39R and the first-side third wiring portions 41R of the touch wirings 31 and sections of the first TFTs 23R. Sections of the void 25B extending the X-axis direction overlap the second wiring portions 40 of the touch wirings 31. According to the configuration, parasitic capacitances between the touch wirings 31 and the touch electrodes 30 that are not connected to the touch wirings 31 are further properly reduced.

As described above, the liquid crystal display device 10 (the display device with a position input function) according to this embodiment includes at least the pixel electrode 24, the pair of the source wirings 27 (signal lines), the touch electrode 30 (the position detection electrode), and the touch wiring 31 (the position detection line). The source wirings 27 transmit signals supplied to the pixel electrode 24. The source wirings 27 are disposed to sandwich the pixel electrode 24. The touch electrode 30 is configured to form a capacitor between the touch electrode 30 and a finger and to detect a position of input by the finger, which is a position input member for positon input. The touch wiring 31 is connected to the touch electrode 30. The touch wiring 31 includes the pair of the first wiring portions 39 and the second wiring portion 40. The first wiring portions 39 are sandwiched between the pixel electrode 24 and the source wirings 27. The second wiring portion 40 bridges the first wiring portions 39.

According to the configuration, the pixel electrode 24 is charged to the potential based on a signal supplied by any one of the source wirings 27 and thus image an image is displayed. The touch electrode 30 is configured to form the capacitor between the touch electrode 30 and the finger and to detect the position of input by the finger using the signal supplied via the touch wiring 31. With the second wiring portion 40 that bridges the first wiring portions 39, the touch wiring 31 is able to supply signals to the touch electrode 30. Because the pixel electrode 24 is sandwiched between the source wirings 27, the parasitic capacitances appear between the pixel electrode 24 and the source wirings 27. The variation in potential of the pixel electrode 24 based on the parasitic capacitances and the variations in potential of the source wirings 27 can be compensated by supplying signals with inverted polarities to the source wirings 27. The touch wiring 31 is configured such that the second wiring portion 40 bridges the first wiring portions 39 and the first wiring portions 39 are disposed between the pixel electrode 24 and the source wirings 27. This configuration is preferable for equalizing the parasitic capacitance between the pixel electrode 24 and one of the source wirings 27 and the parasitic capacitance between the pixel electrode 24 and the other one of the source wirings 27 to each other. By supplying the signals with the inverted polarities to the source wirings 27, the variation in potential of the pixel electrode 24 according to the variation in potential of one of the source wirings 27 and the variation in potential of the pixel electrode 24 according to the variation in potential of the other one of the source wirings 27 are compensated because of the parasitic capacitances that are about equal to each other. Namely, the variations in potential of the pixel electrode 24 can be reduced. Therefore, the reduction in display quality such as the shadowing is less likely to occur.

Multiple pixel electrodes 24 are disposed in a second direction that is perpendicular to a first direction in which the source wirings 27 and the touch wirings 31 are disposed. Multiple first wiring portions 39 are linearly disposed in the second direction. Lines of the first wiring portions 39 are separated from one another in the first direction and opposed ones of the first race portions 39 make pairs. The touch wiring 31 includes the third wiring portion 41 that is constructed from the second metal film 36 (the metal film) which also forms the first wiring portions 39 and the second wiring portion 40. The third wiring portion 41 connects the first wiring portions 39 adjacent to each other in the second direction to each other. The pixel electrodes 24 linearly arranged in the second direction are sandwiched between the first wiring portions 39 that are also linearly arranged. Because the first wiring portions 39 adjacent to each other in the second direction are connected by the third wiring portion 41. Namely, the touch wiring 31 extends in the second direction to cross the pixel electrodes. The third wiring portion 41 is constructed from the second metal film 36 that also forms the first wiring portions 39 and the second wiring portion 40. In comparison to the configuration in which the first wiring portions 39 adjacent to each other in the second direction are connected by the third wiring portion that is constructed from the transparent electrode film disposed in the layer different from the layer in which the first wiring portions 39 are disposed, the wire resistance of the touch wiring 31 can be reduced.

The pixel electrodes 24 are linearly arranged in the second direction that is perpendicular to the first direction in which the source wirings 27 and the touch wirings 31 are arranged. The source wirings 27 extend in the second direction to sandwich the pixel electrodes 24 that are linearly arranged in the second direction. The TFTs 23 are disposed adjacent to the pixel electrodes 24 with respect to the second direction. The first ends of the TFTs 23 are connected to the source wirings 27 and the second ends of the TFTs 23 are connected to the pixel electrodes 24. The TFTs 23 include the first TFTs 23R (the first switching components) and the second TFTs 23L (the second switching components). The first TFTs 23R are disposed closer to the first edges of the pixel electrodes 25 with respect to the first direction. Each first TFT 23R is connected to one of the pixel electrodes 24 adjacent in the second direction and one of the source wirings 27. The second TFTs 23L are disposed closer to the second edges of the pixel electrodes 25 with respect to the first direction. Each second TFTs 23L is connected to the other one of the pixel electrodes 24 adjacent in the second direction and the other one of the source wirings 27. When the first TFT 23R is driven and a signal is supplied to one of the source wirings 27, one of the pixel electrodes 24 adjacent in the second direction and connected to the first TFT 23R is charged to the predefined potential. When the second TFT 23L is driven and a signal is supplied to the other one of the source wirings 27, the other one of the pixel electrodes 24 adjacent in the second direction and connected to the second TFT 23L is charged to the predefined potential. This is preferable for arranging pixels with polarities in the same manner as pixels in dot inverting driving to drive the pixels with lower power consumption.

The source wirings 27 and the touch wiring 31 are disposed in the same layer. In comparison to the configuration in which the source wirings and the touch wiring are disposed in the different layers and separated by the insulating film, this configuration is preferable for reducing the production cost.

The source wirings 27 and the touch wiring 31 are disposed in the layer in which the pixel electrodes 24 are disposed. In comparison to the configuration in which the pixel electrodes are disposed in the layer in which the source wirings 27 and the touch wiring 31 are not disposed and separated from the source wirings 27 and the touch wiring 31 by the insulating film, greater parasitic capacitances appear between the pixel electrodes 24 and the source wirings 27. Therefore, whether the touch wiring 31 is disposed between the pixel electrodes 24 and the source wirings 27 is more likely to be a problem. Therefore, a reduction in display quality is more likely to occur. According to the configuration in which the first wiring portion 39 of the touch wiring 31 is sandwiched between the source wirings 27 and the pixel electrodes 24, the parasitic capacitances are equalized. This configuration is preferable for reducing occurrence of the reduction in display quality. Furthermore, this configuration is preferable for further reducing the production cost.

Second Embodiment

A second embodiment will be described with reference to FIGS. 7 to 10. The second embodiment further includes TFT bridging wirings 44. Configurations, functions, and effects similar to those of the first embodiment will not be described.

Figure 7:
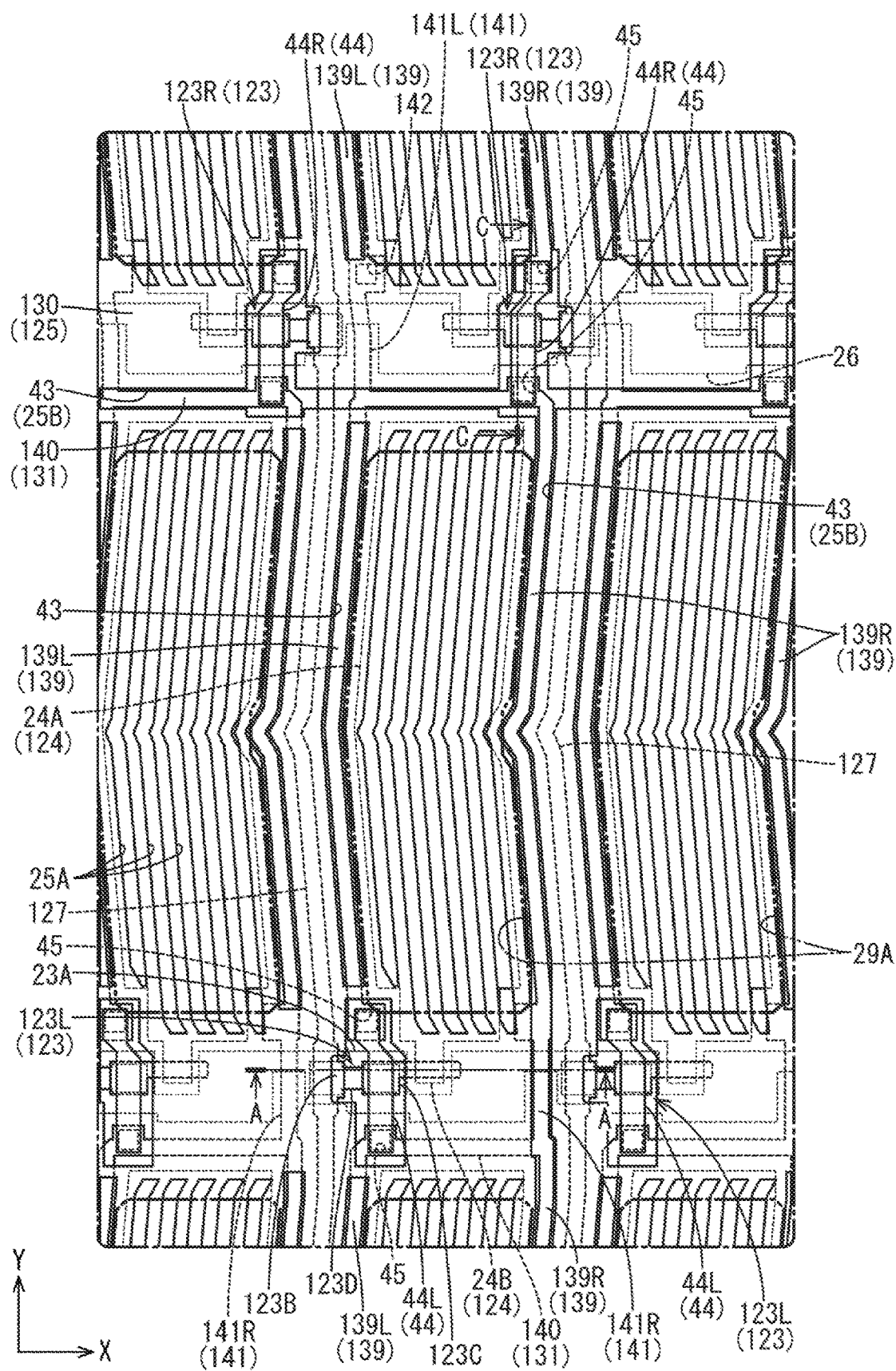
FIG. 7 is a plan view illustrating arrangements of pixels on an array substrate and a CF substrate included in a liquid crystal panel according to a second embodiment.
Figure 8:
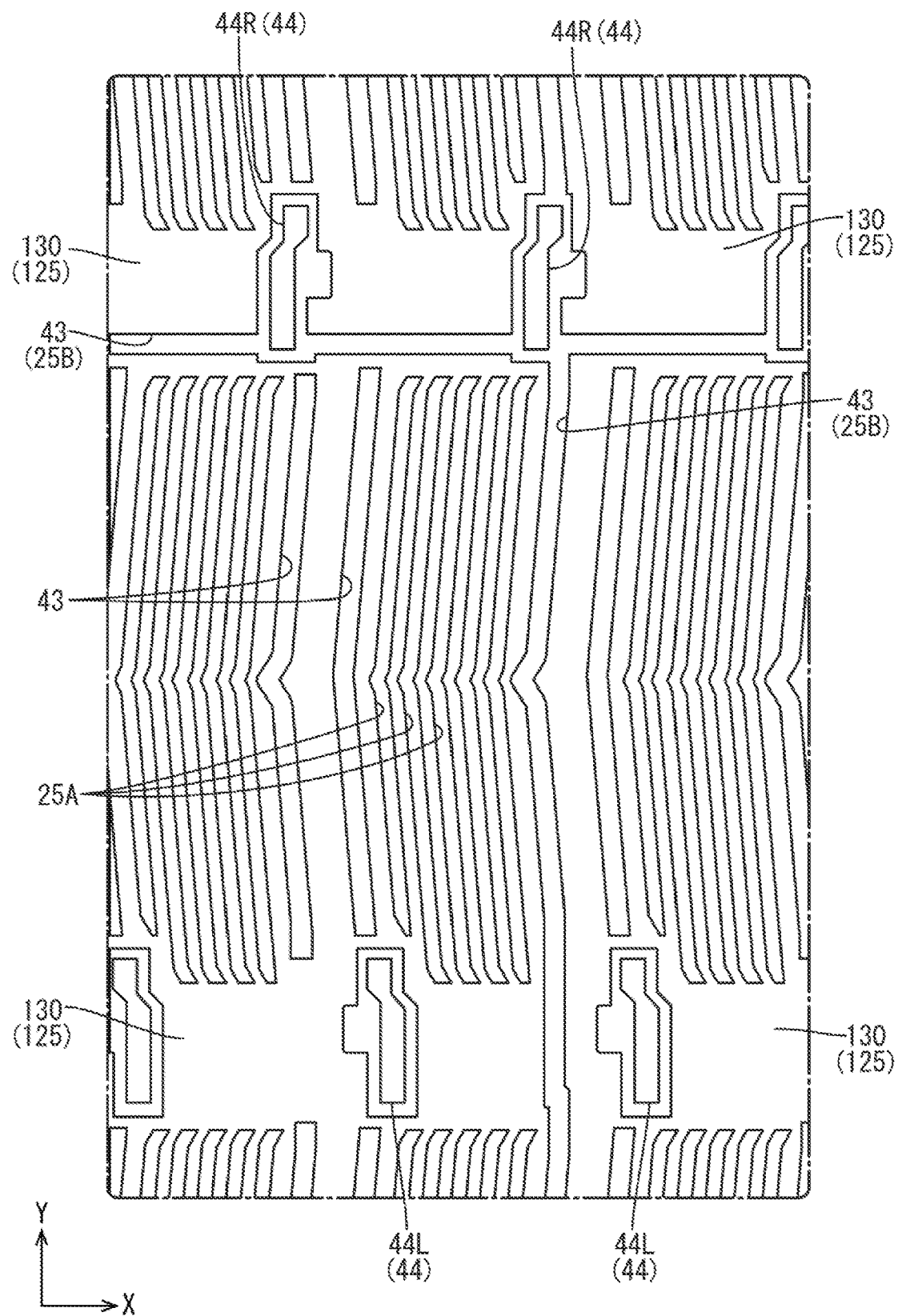
FIG. 8 is a plan view illustrating second transparent electrode film pattern on the array substrate included in the liquid crystal panel.
Figure 9:
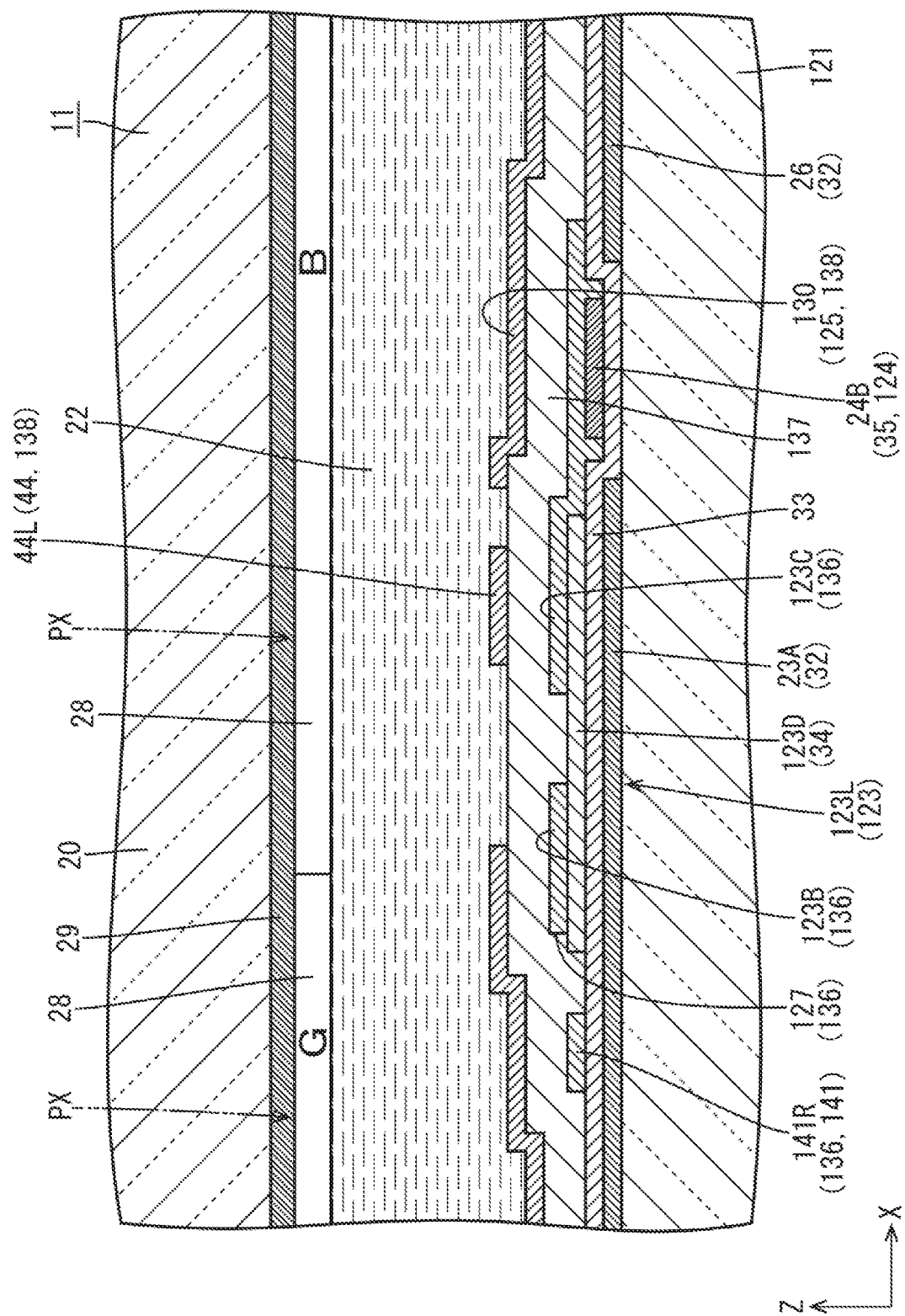
FIG. 9 is a cross-sectional view along line A-A in FIG. 7.
Figure 10:
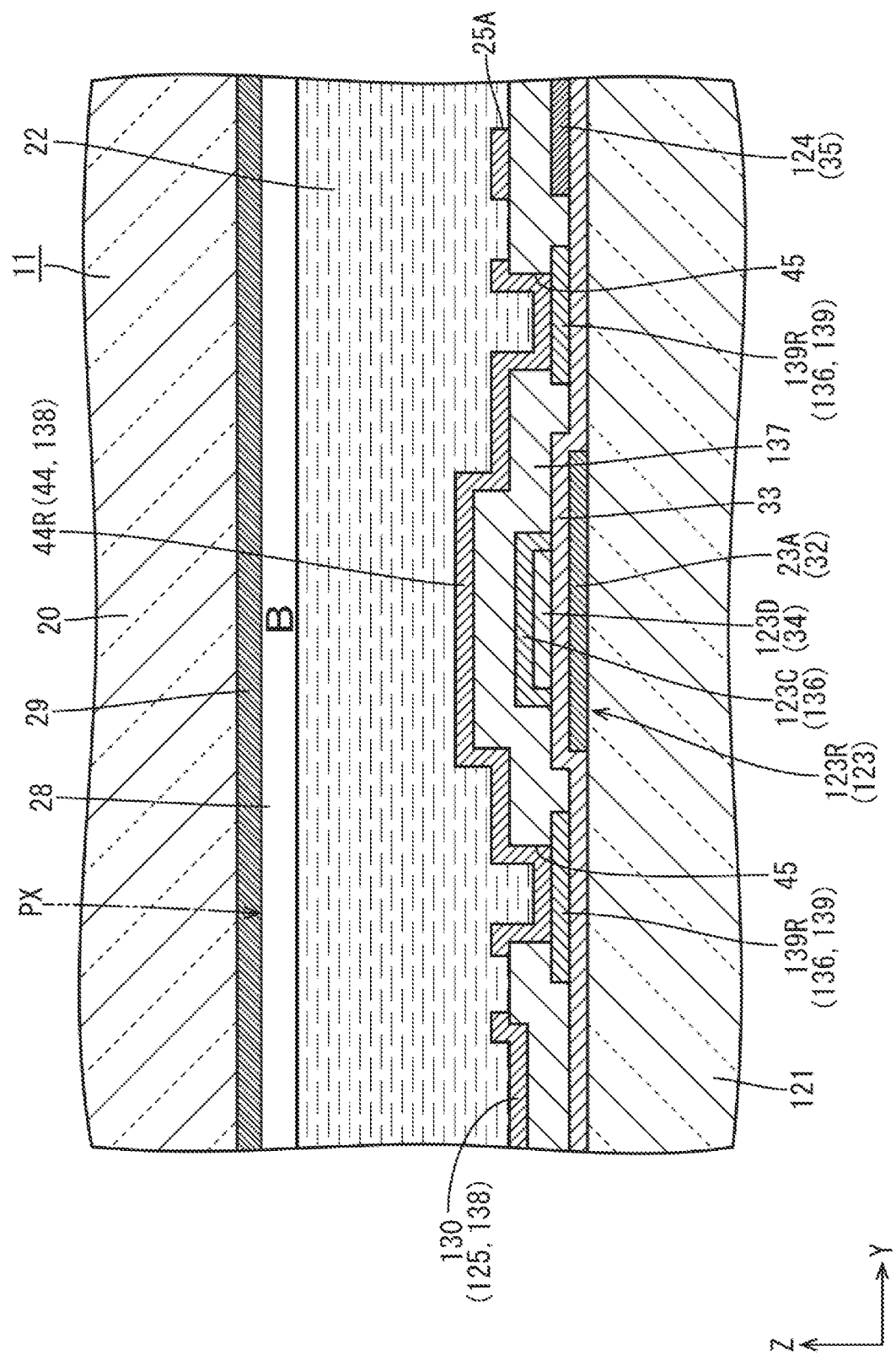
FIG. 10 is a cross-sectional view along line C-C in FIG. 7.

As illustrated in FIGS. 7 and 9, an array substrate 121 according to this embodiment includes the TFT bridging wirings 44 (switching component bridging lines). The TFT bridging wirings 44 are disposed to cross TFTs 123, respectively. An interlayer insulating film 137 (an insulating film) is disposed between the TFTs 123 and the TFT bridging wirings 44. The TFT bridging wirings 44 are connected to touch wirings 131. As illustrated in FIGS. 8 through 10, the TFT bridging wirings 44 are constructed from a second transparent electrode film 138 that also form a common electrode 125 and touch electrodes 130. Ring shaped slits are formed in the second transparent electrode film 138 to form the TFT bridging wirings 44 in an island pattern and to physically separate the TFT bridging wirings 44 from the common electrode 25 and the touch electrodes 130. The TFT bridging wirings 44 extend substantially in the Y-axis direction. Middle portions of the TFT bridging wirings 44 at the middle in long dimensions of the TFT bridging wirings 44 overlap drain electrodes 123C of the TFTs 123. Ends of the TFT bridging wirings 44 are disposed to overlap first wiring portions 139 adjacent in the Y-axis direction. The first wiring portions 139 are portions of the touch wirings 131. Specifically, a first end of each TFT bridging wiring 44 overlaps a first end of one of the first wiring portions 139 adjacent in the Y-axis direction and a second end of each TFT bridging wiring 44 overlaps a connecting point between a second end of the other one of the first wiring portions 139 adjacent in the Y-axis direction and a second wiring portion 140. Ends (portions) of the TFT bridging wiring 44 are connected to the first wiring portions 139 included in the touch wiring 131 and adjacent in the Y-axis direction via a pair of contact holes 45. The contact holes 45 are arranged at positions overlap the ends of the first wiring portions 139 adjacent in the Y-axis direction on the TFT 123 side. The portions of the TFT bridging wiring 44 are connected to the first wiring portions 139 adjacent in the Y-axis direction through the contact holes 45 in the interlayer insulating film 137, respectively. Namely, the touch wiring 131 extends to cross multiple pixel electrodes 124 in the Y-axis direction.

As illustrated in FIGS. 7 and 8, the TFT bridging wirings 44 include first TFT bridging wirings 44R (first switching component bridging lines) and second TFT bridging wirings 44L (second switching component bridging lines). The first bridging wirings 44R overlap first TFTs 123R. The second TFT bridging wirings 44L overlap second TFTs 123L. When the TFT bridging wirings 44 overlapping the first TFTs 123R and the TFT bridging wirings 44 overlapping the second TFTs 123L are distinguished from each other, the TFT bridging wirings 44 overlapping the first TFTs 123R will be referred to as first TFT bridging wirings with reference symbol 44R and the TFT bridging wirings 44 overlapping the second TFTs 123L will be referred to as second TFT bridging wirings with reference symbol 44L. When they are not distinguished from each other, the TFT bridging wirings are referred to as the TFT bridging wirings 44. The first TFT bridging wirings 44R include middle sections that cross the first TFTs 123R. Ends of each first TFT bridging wiring 44R are connected to first-side first wiring portions 139R adjacent in the Y-axis direction through the contact holes 45. The second TFT bridging wirings 44L include middle sections that cross the second TFTs 123L. Ends of each second TFT bridging wiring 44L are connected to second-side first wiring portions 139L adjacent in the Y-axis direction through the contact holes 45. The first TFT bridging wirings 44R and the second TFT bridging wirings 44L are alternately arranged in the Y-axis direction in a zigzag manner similar to the TFTs 123. First-side third wiring portions 141R and second-side third wiring portions 141L included in the third wiring portions 141 are arranged in areas in which the TFT bridging wirings 44 and the TFTs 123 are not disposed. The first-side third wiring portions 141R and the second-side third wiring portions 141L are arranged in a zigzag manner in the plan view. The third wiring portions 141 are disposed in the areas in which the TFT bridging wirings 44 and the TFTs 123 are not disposed as if to fill the areas. The first-side first wiring portions 139R of the touch wirings 131 arranged along the Y-axis direction are connected to the first TFT bridging wirings 44R and the first-side third wiring portions 141R to extend for substantially an entire length of the display area AA. The second-side first wiring portions 139L are connected to the second TFT bridging wirings 44L and the second-side third wiring portions 141L to extend for substantially the entire length of the display area AA. The first wiring portions 139 of the touch wirings 131 are connected to the TFT bridging wirings 44 and the third wiring portions 141 that are arranged in the zigzag manner to complement with each other. According to the configuration, the wire resistances of the touch wirings 131 can be reduced. The TFT bridging wirings 44 are disposed to cross the TFTs 123 but the interlayer insulating film 137 is disposed between the TFT bridging wirings 44 and the TFTs 123. Therefore, short circuits between the TFTs 123 and the TFT bridging wirings 44 are less likely to occur. Sections of the TFT bridging wirings 44 crossing the TFTs 123 do not overlap the channels 123D but overlap the drain electrodes 123C. This configuration is for restricting leak currents between source electrodes 123B and the drain electrodes 123C from varying due variations in potential of the common electrode 125 (touch electrodes 130, the touch wirings 131, the TFT bridging wirings 44) when the TFTs 123 are turned off.

As illustrated in FIGS. 7 and 8, the TFT bridging wirings 44 are constructed from the second transparent electrode film 138 and disposed in the layer in which the touch electrodes 130 are disposed. The interlayer insulating film 137 includes touch contact holes 142 (position detection contact holes) in addition to the contact holes 45 described earlier. The touch contact holes 142 are for connecting the touch wirings 131 to the touch electrodes 130. The TFT bridging wirings 44 and the touch electrodes 130 are connected to the touch wirings 131. The contact holes 45 and the touch contact holes 142 are formed in the interlayer insulating film 137 to connect the TFT bridging wirings 44 and the touch electrodes 130 to the touch wirings 131. This configuration is preferable for reducing the production cost.

As described above, according to this embodiment, the pixel electrodes 124 are linearly arranged in the second direction perpendicular to the first direction in which source wirings 127 and the touch wirings 131 are arranged. Multiple pairs of the first wiring portions 139 are linearly arranged in the second direction. The TFTs 123 (the switching components) are disposed adjacent to the pixel electrodes 124 in the second direction. The first end of each TFT 123 is connected to the source wirings 127 and the second end is connected to the pixel electrode 124. The TFT bridging wirings 44 are disposed to cross the TFTs 123 such the interlayer insulating film 137 (the insulating film) between the TFTs 123 and the TFT bridging wirings 44. The portions of each TFT bridging wiring 44 are connected to the first wiring portions 139 adjacent in the second direction through the contact holes 45 in the interlayer insulating film 137, respectively. When the TFTs 123 are driven, signals transmitted to the source wirings 127 are supplied to the pixel electrodes 124 and the pixel electrodes 124 are charged to the predefined potentials. The TFT bridging wirings 44 are disposed to cross the TFTs 123 but protected from short circuits by the interlayer insulating film 137 disposed between the TFT bridging wirings 44 and the TFTs 123. The portions of each TFT bridging wiring 44 are connected to the first wiring portions 139 adjacent in the second direction through the contact holes 45 in the interlayer insulating film 137, respectively. The touch wirings 131 extend to cross the pixel electrodes 124 in the second direction.

The interlayer insulating film 137 includes the touch contact holes 142 (the position detection contact holes) for connecting the touch wirings 131 to the touch electrodes 130. The TFT bridging wirings 44 and the touch electrodes 130 are connected to the touch wirings 131. Through the contact holes 45 and the touch contact holes 142 formed in the interlayer insulating film 137, the TFT bridging wirings 44 and the touch electrodes 130 can be connected to the touch wirings 131. This configuration is preferable for reducing the production cost.

The TFT bridging wirings 44 are disposed to cross the TFTs 123. The interlayer insulating film 137 is disposed between the TFTs 123 and the TFT bridging wirings 44. The portions of each TFT bridging wiring 44 are connected to the first wiring portions 139 adjacent in the second direction through the contact holes 45 formed in the interlayer insulating film 137, respectively. The touch wirings 131 include the third wiring portions 141 constructed from a second metal film 136 that also forms the first wiring portions 139 that are linearly arranged in the second direction and the second wiring portions 140. Each third wiring portion 141 connects the first wiring portions 139 adjacent in the second direction. The third wiring portions 141 are disposed not to overlap the first TFTs 123R and the second TFTs 123L. The bridging wirings 44 include the first TFT bridging wirings 44R (the first switching component bridging lines) and the second TFT bridging wirings 44L (the second switching component bridging lines). The first TFT bridging wirings 44R overlap the first TFTs 123R. The second TFT bridging wirings 44L overlap the second TFTs 123L. The third wiring portions 141 include the first-side third wiring portions 141R and the second-side third wiring portions 141L. Each first-side third wiring portion 141R connects the first-side first wiring portions 139 together. Each second-side third wiring portion 141L connects the second-side first wiring portions together. The pixel electrodes 124 linearly arranged in the second direction are sandwiched between the first wiring portions 139 that are also linearly arranged. The first-side first wiring portions 139 of the touch wirings 131 arranged in the second direction are connected to the portions of the first TFT bridging wirings 44R overlapping the first TFTs 123R through the contact holes 45 formed in the interlayer insulating film 137. The second-side first wiring portions 139 are connected to the portions of the second TFT bridging wirings 44L overlapping the second TFTs 123L through the contact holes 45 formed in the interlayer insulating film 137. In addition, the first-side first wiring portions 139 of the touch wirings 131 adjacent in the second direction are connected to each other by the first-side third wiring portions 141R disposed not to overlap the first TFTs 123R and the second TFTs 123L. The second-side first wiring portions 139 are connected to each other by the second-side third wiring portions 141L disposed not to overlap the first TFTs 123R and the second TFTs 123L. The first wiring portions 139 of the touch wirings 131 are connected to each other by the TFT bridging wirings 44 and the third wiring portions 141 that are arranged in the zigzag manner to complement with each other. According to the configuration, the wire resistances of the touch wirings 131 can be reduced. The TFT bridging wirings 44 are disposed to cross the TFTs 123 but short circuits of the TFTs 123 are less likely to occur because the interlayer insulating film 121 is disposed between the TFT bridging wirings 44 and the TFTs 123. As described above, by reducing the wire resistances of the touch wirings 131, higher accuracy is obtained in detection of input positions at which input operation by the finger that is the position input member is performed. Variations in potential are less likely to occur at switching between the touch signal from the touch wirings 131 and the common signal for the reference potential. Therefore, the reduction in display quality is less likely to occur.

Third Embodiment

A third embodiment will be described with reference to FIGS. 11 and 12. The third embodiment includes a second transparent electrode film 238 having a configuration different from that of the second embodiment. Configurations, functions, and effects similar to those of the second embodiment will not be described.

Figure 11:
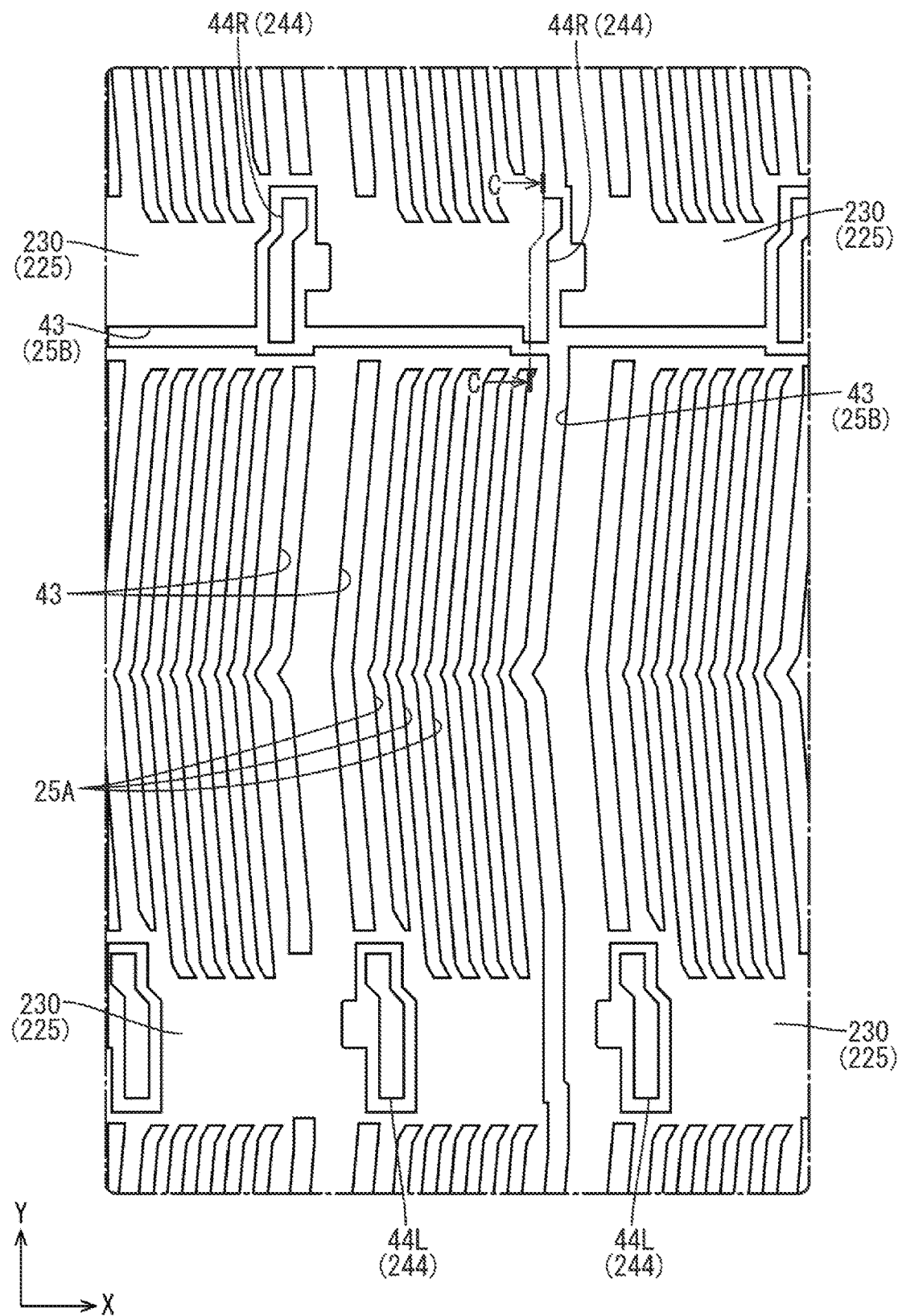
FIG. 11 is a plan view illustrating second transparent wirings on an array substrate included in a liquid crystal panel according to a third embodiment.
Figure 12:
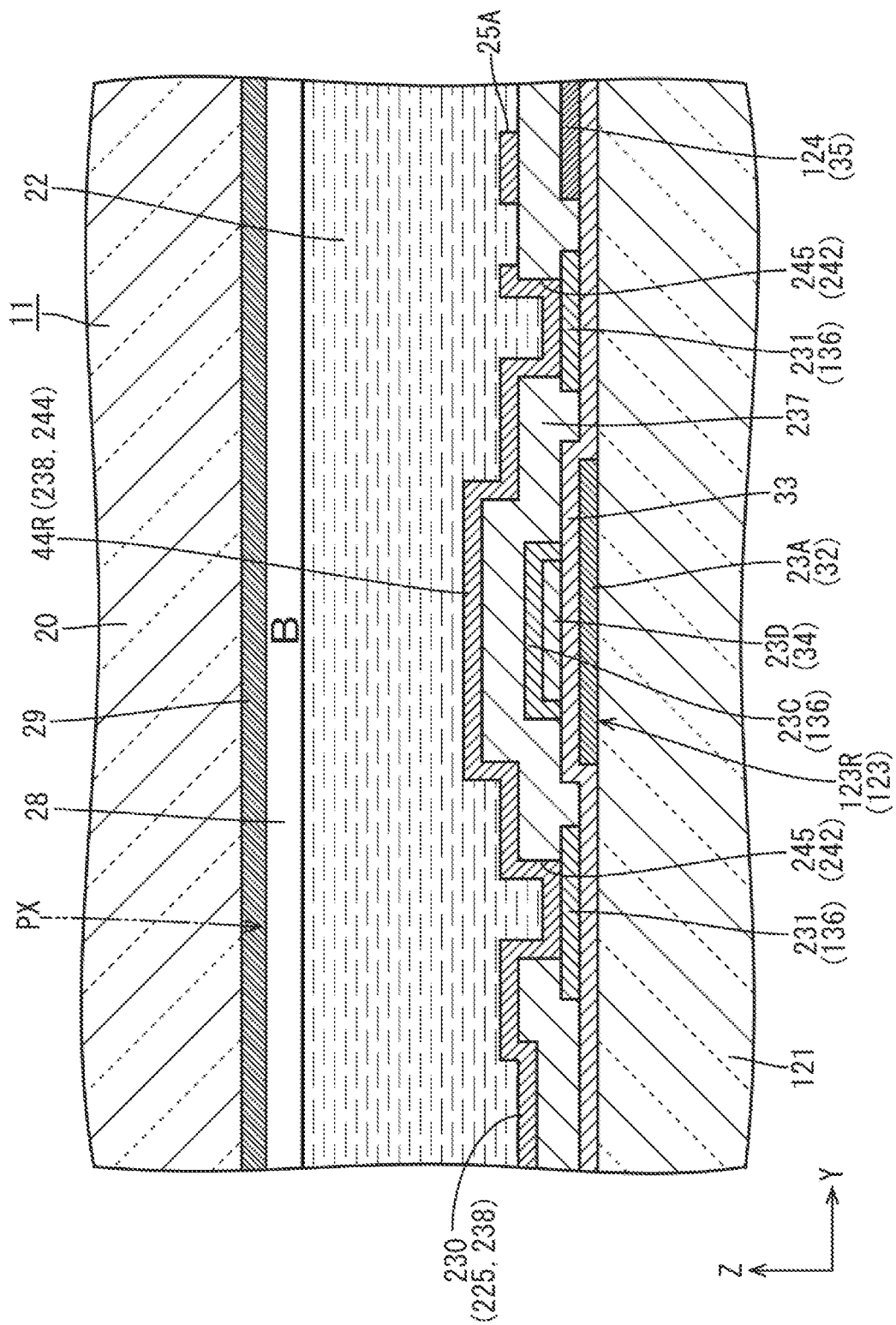
FIG. 12 is a cross-sectional view along line C-C in FIG. 11.

As illustrated in FIGS. 11 and 12, the second transparent electrode film 238 according to this embodiment includes TFT bridging wirings 244, some of which are integrated with a common electrode 225 and touch electrodes 230. The TFT bridging wirings 244 integrated with the common electrode 225 and the touch electrodes 230 connect touch wirings 231 to the target touch electrodes 230 through contact holes 245 formed in an interlayer insulating film 237. Namely, the contact holes 245 in the interlayer insulating film 237 overlapping the TFT bridging wirings 244 integrated with the common electrode 225 and the touch electrode 230 also function as touch contact holes 242.

Fourth Embodiment

A fourth embodiment will be described with reference to FIGS. 12 to 15. The fourth embodiment includes pixel electrode bridging wirings 46 in addition to the configuration of the first embodiment. Configurations, functions, and effects similar to those of the first embodiment will not be described.

Figure 13:
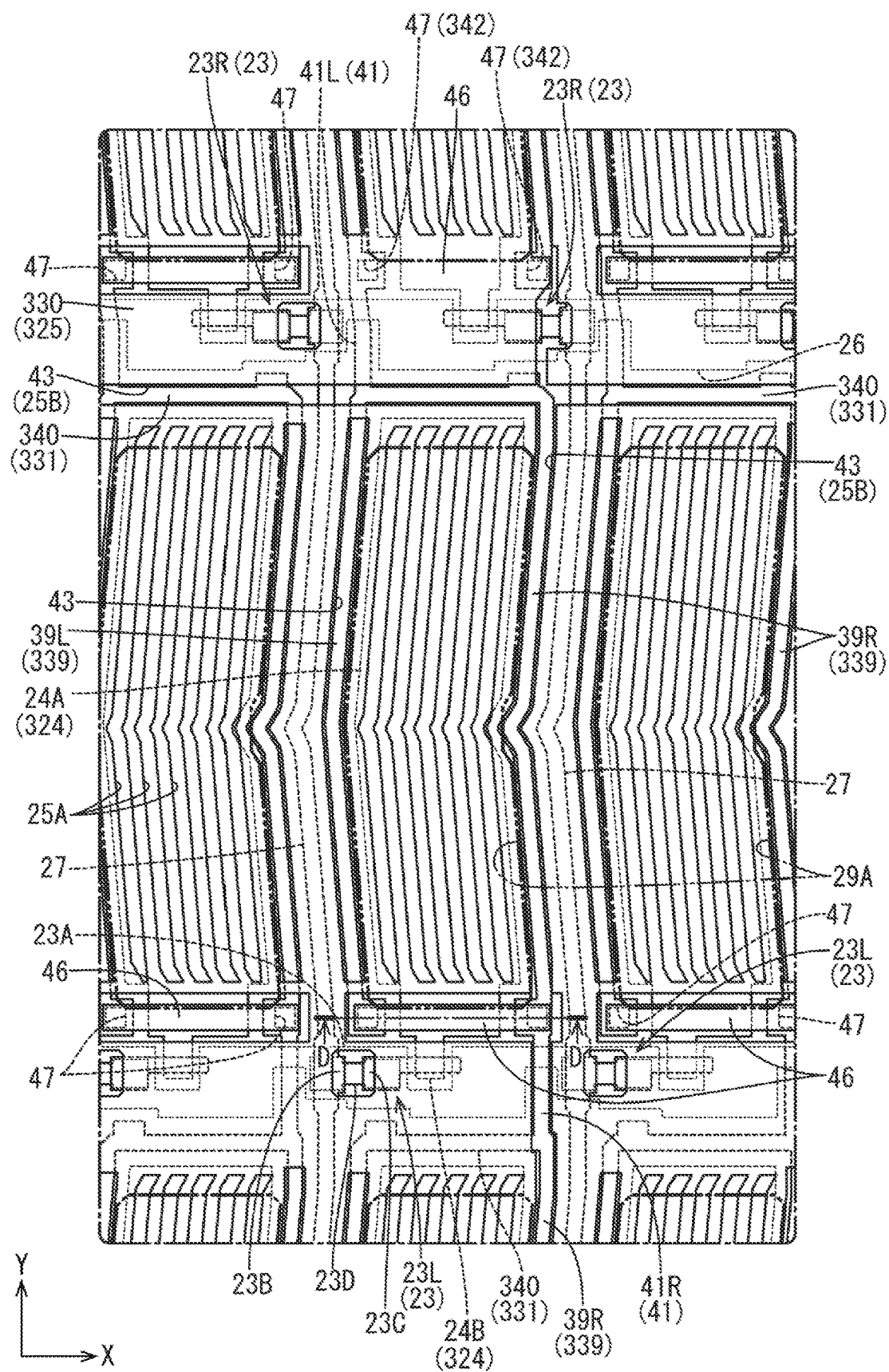
FIG. 13 is a plan view illustrating arrangements of pixels on an array substrate and a CF substrate included in a liquid crystal panel according to a fourth embodiment.
Figure 14:
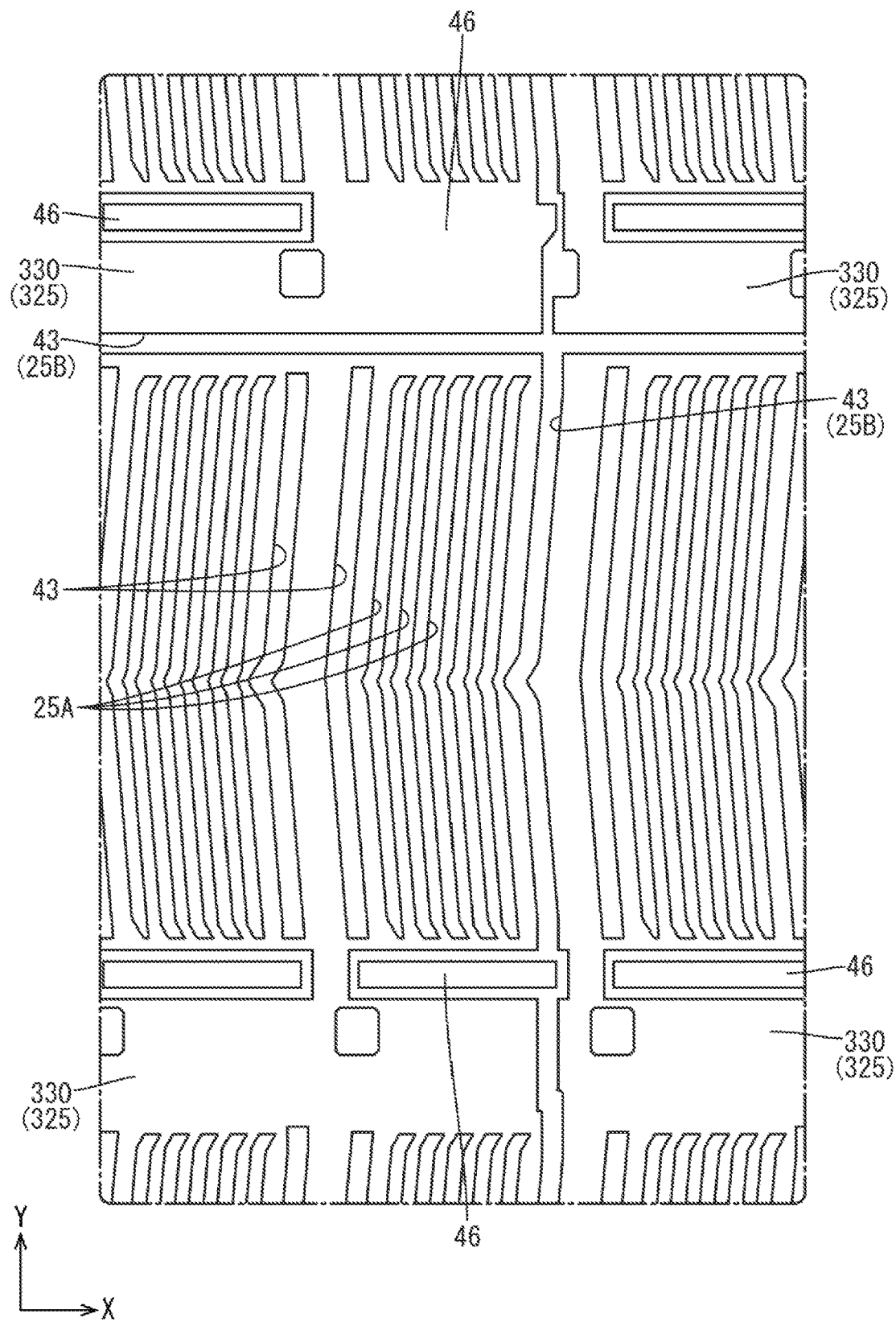
FIG. 14 is a plan view illustrating second transparent electrode film wirings on the array substrate included in the liquid crystal panel.
Figure 15:
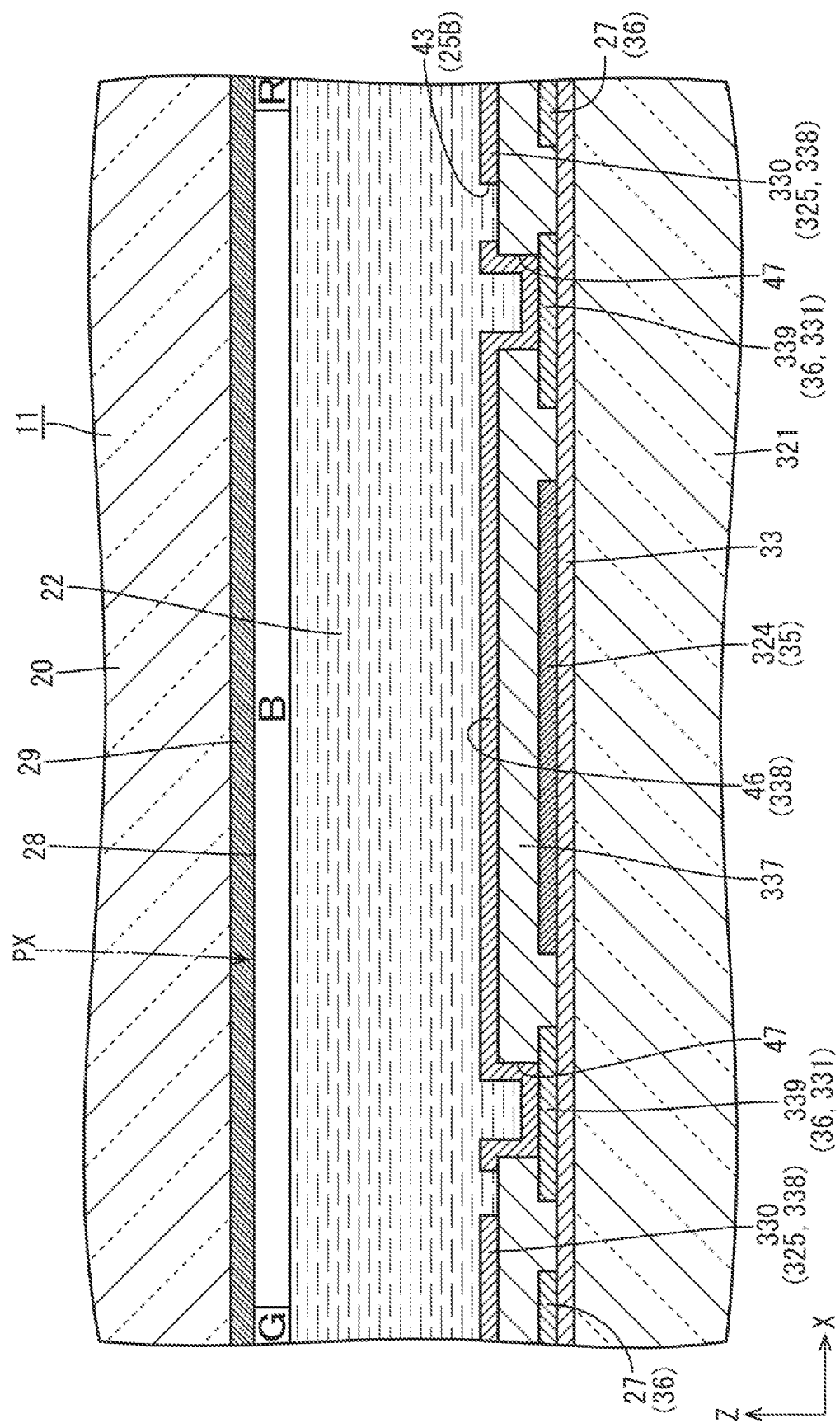
FIG. 15 is a cross-sectional view along line D-D in FIG. 13.

As illustrated in FIGS. 13 to 15, an array substrate 321 according to this embodiment includes the pixel electrode bridging wirings 46 disposed to cross pixel electrodes 324 and connected to touch wirings 331. An interlayer insulating film 337 is disposed between the pixel electrodes 324 and the pixel electrode bridging wirings 46. The pixel electrode bridging wirings 46 extend substantially linearly along the X-axis direction. Middle sections of the pixel electrode bridging wirings 46 in the middle of the long dimension of the pixel electrode bridging wirings 46 overlap the pixel electrodes 324. Ends of the pixel electrode bridging wirings 46 at ends of the long dimension form the touch wirings 331. The touch wirings 331 overlap first wiring portions 339. The first wiring portions 339 in each pair sandwich the pixel electrodes 324 from sides with respect to the X-axis direction. The ends of each pixel electrode bridging wiring 46 overlap ends of the first wiring portions 339 that sandwich the pixel electrode 324 from the sides with respect to the X-axis direction on an opposite side from a second wiring portion 340. The ends (portions) of each pixel electrode bridging wiring 46 are connected to the first wiring portions 339 that sandwich the pixel electrode 324 from the side with respect to the X-axis direction through contact holes 47 formed in the interlayer insulating film 337. The first wiring portions 339 are portions of the touch wirings 331. The portions of each pixel electrode bridging wiring 46 are connected to the first wiring portions 339 that sandwich the pixel electrode 324 from the sides with respect to the X-axis direction through the contact holes 47 formed in the interlayer insulating film 337, respectively. According to the configuration, wire resistances of the touch wirings 331 can be reduced.

As illustrated in FIGS. 13 and 14, the pixel electrode bridging wirings 46 are constructed from a second transparent electrode film 338 and disposed in the layer in which touch electrodes 330 are disposed. The interlayer insulating film 337 includes touch contact holes 342 (position detection contact holes) for connecting the touch wirings 331 to the touch electrodes 330 in addition to the contact holes 47 described earlier. The pixel electrode bridging wirings 46 and the touch electrodes 330 are connected to the touch wirings 331. By forming the contact holes 47 and the touch contact holes 342 in the interlayer insulating film 337, the pixel electrode bridging wirings 46 and the touch electrodes 330 can be connected to the touch wirings 331. This configuration is preferable for reducing the production cost.

As illustrated in FIG. 14, the second transparent electrode film 338 according to this embodiment includes the pixel electrode bridging wirings 46, some of which are integrated with the common electrode 325 and the touch electrodes 330. The pixel electrode bridging wirings 46 that are integrated with the common electrode 325 and the touch electrodes 330 are connected to the touch electrodes 330 to which the touch wirings 331 are connected through the contact holes 47 formed in the interlayer insulating film 337. Namely, the contact holes 47 overlapping the pixel electrode bridging wirings 46 integrated with the common electrodes 325 and the touch electrodes 330 also function as the touch control holes 342.

As described above, according to this embodiment, the pixel electrodes 324 and the touch wirings 331 are disposed in the same layer. In each touch wiring 331, the first ends of the first wiring portions 339 in each pair are connected to the second wiring portion 340. The pixel electrode bridging wirings 46 are disposed to cross the pixel electrodes 324. The interlayer insulating film 337 is disposed between the pixel electrodes 324 and the pixel electrode bridging wirings 46. The portions of each pixel electrode bridging wiring 46 are connected to the second ends of the corresponding first wiring portions 339, respectively, through the contact holes 47 formed in the interlayer insulating film 337. In comparison to a configuration in which the pixel electrodes and the touch wirings are disposed in different layers separated by an insulating film, this configuration is preferable for reducing the production cost. In each touch wiring 331, the first ends of the first wiring portions 339 in each pair are connected to the corresponding second wiring portion 340. The second ends of the first wiring portions 339 are connected to the sections of the corresponding pixel electrode bridging wiring 46 that is disposed to cross the corresponding pixel electrode 324 through the contact holes 47 formed in the interlayer insulating film 337. The interlayer insulating film 337 is disposed between the pixel electrode 324 and the pixel electrode bridging wiring 46. According to the configuration, the wire resistances of the touch wirings 331 can be reduced. With the touch wirings 331 having the reduced wire resistances, higher accuracy is obtained in detection of input positions at which input operation by the finger, which is the position input member, is performed. Variations in potential are less likely to occur at switching between the touch signal from the touch wirings 331 and the common signal for the reference potential. Therefore, the reduction in display quality is less likely to occur.

The pixel electrode bridging wirings 46 are disposed in the layer in which the touch electrodes 330 are disposed. The interlayer insulating film 337 includes the touch contact holes 342 (the position detection contact holes) for connecting the touch wirings 331 to the touch electrodes 330. The pixel electrode bridging wirings 46 and the touch electrodes 330 are connected to the touch wirings 331. Through the contact holes 47 and the touch contact holes 342 formed in the interlayer insulating film 337, the pixel electrode bridging wirings 46 and the touch electrodes 330 are connected to the touch wirings 331. This configuration is preferable for reducing the production cost.

Fifth Embodiment

A fifth embodiment will be described with reference to FIGS. 16 and 17. The fifth embodiment includes third wiring portions 441 and TFT bridging wirings 444 arranged differently from the second embodiment. Configurations, functions, and effects similar to those of the second embodiment will not be described.

Figure 16:
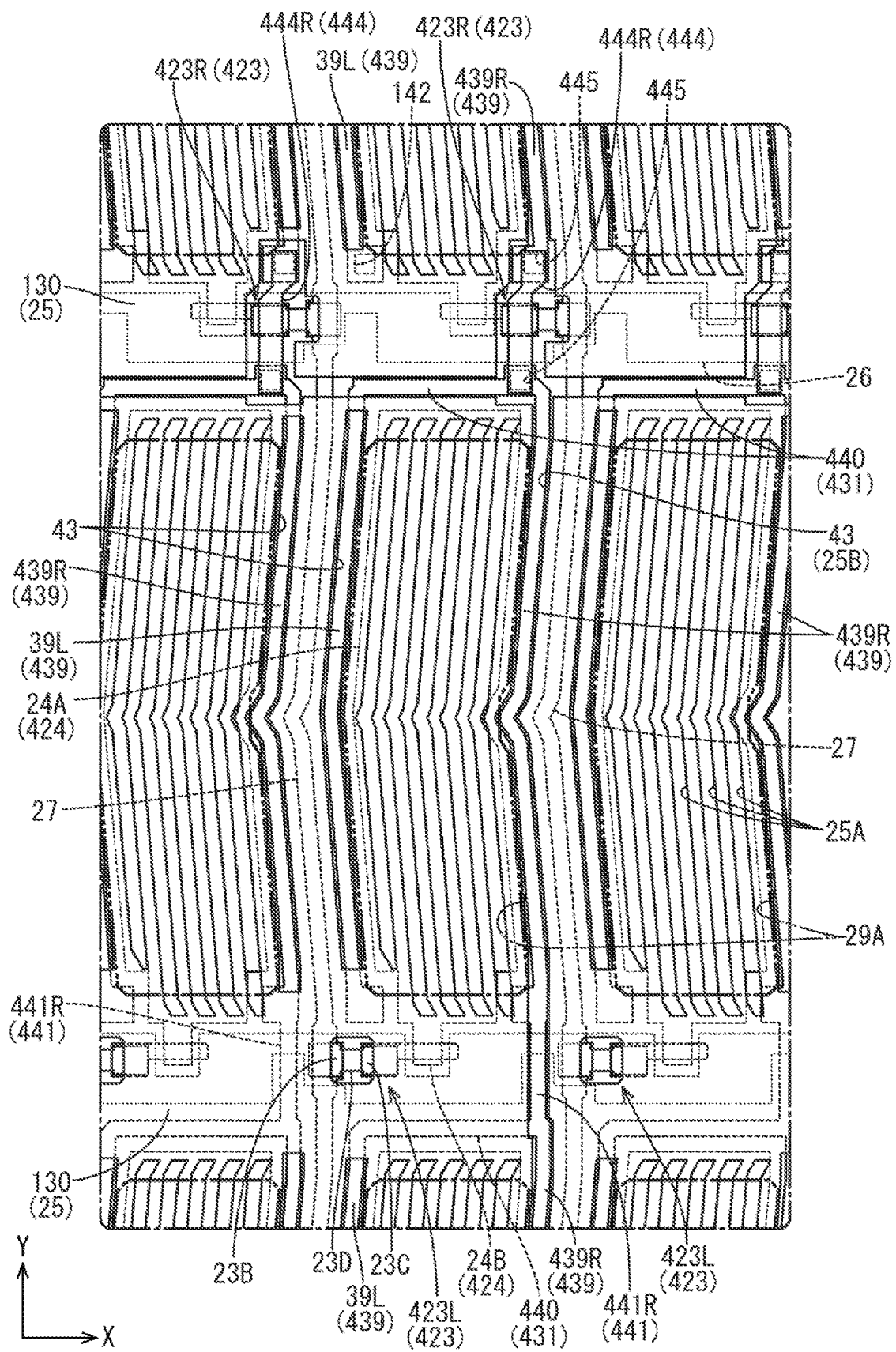
FIG. 16 is a plan view illustrating arrangements of pixels on an array substrate and a CF substrate included in a liquid crystal panel according to a fifth embodiment.
Figure 17:
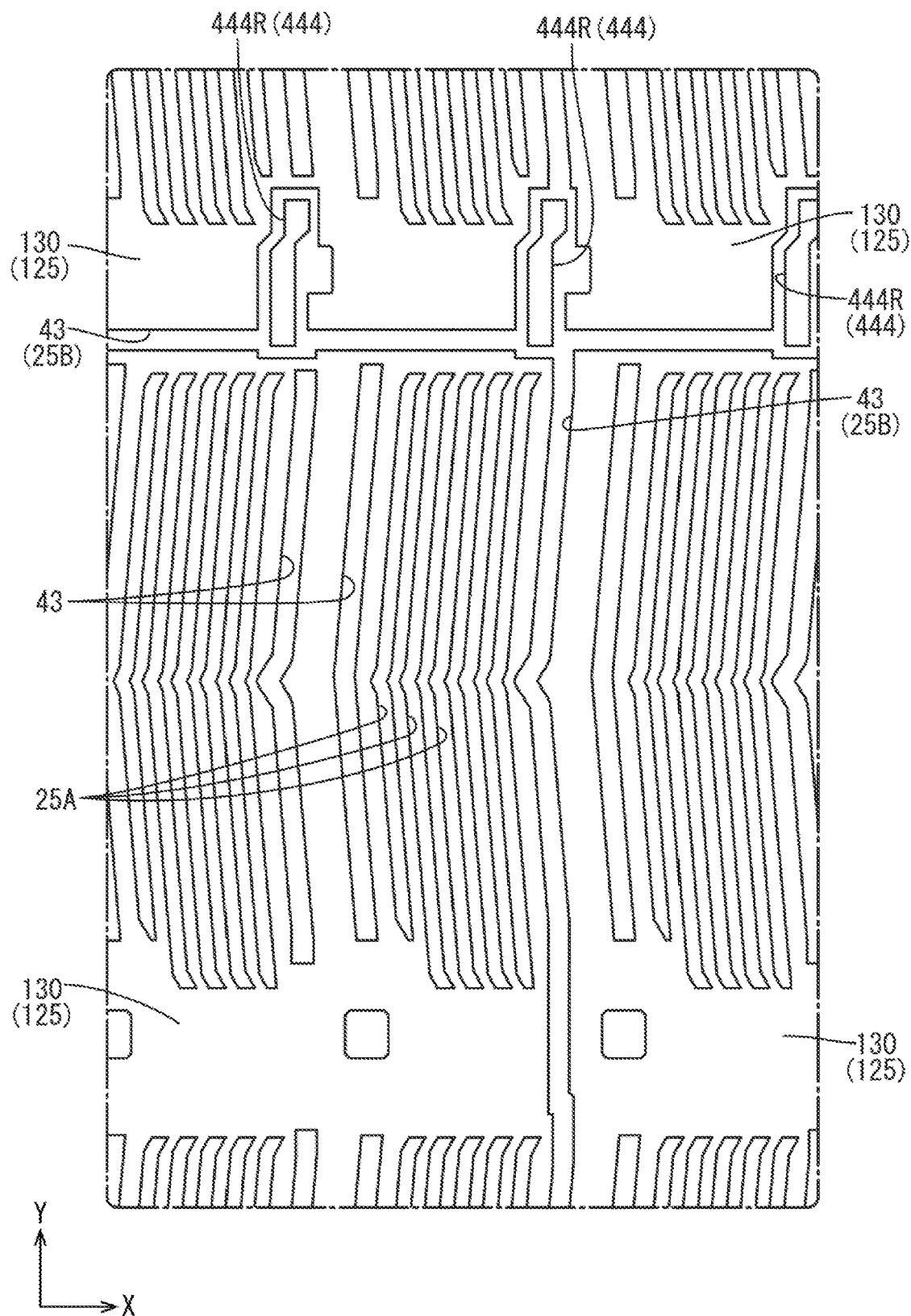
FIG. 17 is a plan view illustrating a second transparent electrode film pattern on the array substrate included in the liquid crystal panel.

As illustrated in FIG. 16, touch wirings 431 according to this embodiment include pairs of first wiring portions 439, second wiring portions 440, and third wiring portions 441R. Namely, this embodiment does not include the second-side third wiring portions 141L included in the second embodiment. The third wiring portions 441 include only the third wiring portions 441R on the first side. Each third wiring portion 441 connects the first-side first wiring portions 439 adjacent to each other in the Y-axis direction together. The TFT bridging wirings 44 include only first-side TFT bridging wirings 444R on the first side overlapping first TFTs 423R. This embodiment does not include the second TFT bridging wirings 44L included in the second embodiment.

The TFT bridging wirings 444 do not overlap second TFTs 423L and selectively overlap the first TFTs 423R. The third wiring portions 441 are disposed to selectively connect the first-side first wiring portions with one another. First-side first wiring portions 439R of the touch wirings 431 arranged along the Y-axis direction are connected with one another by the first-side third wiring portions 441R and the first-side TFT bridging wirings 444R that are alternately arranged in the Y-axis direction. According to the configuration, creepage distances of the touch wirings 431 can be reduced and thus wire resistances of the touch wirings can be reduced.

According to this embodiment, the TFT bridging wirings 444 are disposed to cross the TFTs 423. The interlayer insulating film is disposed between the TFTs 423 and the TFT bridging wirings 444. Portions of the TFT bridging wirings 444 are connected to the first wiring portions 439 adjacent in the second direction, respectively, through contact holes 445 formed in the interlayer insulating film. The touch wirings 431 include the third wiring portions 441 that are constructed from the second metal film that also forms the first wiring portions 439 and the second wiring portions 440. Multiple pairs of the first wiring portions 439 are arranged in each line in the second direction. The third wiring portions 441 are disposed not to overlap the TFTs 423. The third wiring portions 441 connect the first wiring portions 439 adjacent in the second direction with one another. The third wiring portions 441 are disposed not to overlap the first TFTs 423R and the second TFT 423L. The TFT bridging wirings 444 are selectively disposed not to overlap the second TFTs 423L but to overlap the first TFTs 423R. The third wiring portions 441 are selectively disposed to connect the first-side first wiring portions 439R with one another. Pixel electrodes 424 are sandwiched between the corresponding pairs of the first wiring portions 439. The first-side first wiring portions 439R of the touch wirings 431 are connected to the portions of the TFT bridging wirings 444 not overlapping the second TFTs 423L but overlapping the first TFTs 423R through the contact holes 445. The first-side first wiring portions 439R of the touch wirings 431 are connected by the third wiring portions that are disposed not to overlap the first TFTs 423R and the second TFTs 423L. Because the first-side first wiring portions 439R are connected selectively by the TFT bridging wirings 444 and the third wiring portions 441. Therefore, the creepage distances of the touch wirings 431 are reduced and thus the wire resistances of the touch wirings can be reduced. The TFT bridging wirings 444 are disposed to cross the TFTs 423. Because the interlayer insulating film is disposed between the TFTs 423 and the TFT bridging wirings 444, short circuits between the TFTs 423 and the TFT bridging wirings 444 are less likely to occur.

Other Embodiments

The technology disclosed herein is not limited to the embodiments described above and with reference to the drawings. The following embodiments may be included in the technical scope.

(1) In each of the above embodiments, the source wirings and the touch wirings are made of the same material. However, the source wirings and the touch wirings may be disposed in the same layer but made of different materials.

(2) In each of the above embodiments, the source wirings and the touch wirings are disposed in the same layer. However, the source wirings and the touch wirings may be disposed in different layers. In such a configuration, the third metal film may be disposed over the second metal film with an insulating film between the third metal film and the second metal film. Furthermore, the source wirings may be constructed from the second metal film and the touch wirings may be constructed from the third metal film.

(3) In each of the above embodiments, the source wirings, the touch wirings, and the pixel electrodes are disposed in the same layer. However, the pixel electrodes may be disposed in a layer different from a layer in which the source wirings and the touch wirings are disposed. For example, the insulating layer may be disposed on the second metal film and the first transparent electrode film may be disposed over the insulating film. The source wirings and the touch wirings may be constructed from the second metal film and the pixel electrodes may be constructed from the first transparent film. Alternatively, the source wirings, the touch wirings, and the pixel electrodes may be disposed in different layers, respectively.

(4) In each of the above embodiments, the touch wirings are provided for lines of the pixel electrodes, respectively. The lines of the pixel electrodes are arranged in the X-axis direction. However, the touch wirings may be selectively provided for specified pixel electrodes in the lines of the pixel electrodes. For example, the touch wirings may be provided only for the pixel electrodes that form blue pixel portions overlapping the blue color filters. The touch wirings may be provided for other pixel electrodes. The arrangement of the touch wirings can be altered where appropriate.

(5) In each of the above embodiments, the first TFTs and the second TFTs are disposed closer to the first ends of the pixel electrodes and the second ends of the pixel electrodes, respectively. The first TFTs and the second TFTs are disposed in the zigzag manner. The TFTs adjacent in the Y-axis direction may be linearly arranged in the Y-axis direction. In such a configuration, the TFTs may be disposed closer to the first ends or the second ends of the pixel electrodes with respect to the X-axis direction or may not be closer to the first ends or the second ends of the pixel electrodes.

(6) In the second embodiment, the TFT bridging wirings are constructed from the second transparent electrode film. However, an insulating film may be disposed on the second metal film that forms the source wirings and the touch wirings and the first transparent electrode film that forms the pixel electrodes may be disposed over the insulating film. In such a configuration, the TFT bridging wirings may be formed form the first transparent electrode film.

(7) In the fourth embodiment, the pixel electrode bridging wirings are constructed from the second transparent electrode film. However, an insulating film may be disposed on the second metal film that forms the source wirings and the touch wirings and the first transparent electrode film that forms the pixel electrodes may be disposed over the insulating film. In such a configuration, the pixel electrode bridging wirings may be constructed from the first metal film or the second metal film.

(8) The display device may include both the TFT bridging wirings in the second embodiment and the pixel electrode bridging wirings in the fourth embodiment.

(9) In the fifth embodiment, the first-side wiring portions arranged in the Y-axis direction are connected to the first-side third wiring portions and the first TFT bridging wirings. However, the second-side first wiring portions arranged in the Y-axis direction may be connected to the second-side third wiring portions and the second TFT bridging wirings.

(10) The two-dimensional arrangement of the contact holes may be altered from those in the above embodiments where appropriate.

(11) The technical matters in the above embodiments may be combined where appropriate.

(12) In each of the above embodiments, the light blocking portion is provided on the CF substrate. However, the light blocking portion may be provided on the array substrate.

(13) The semiconductor film that forms the channels of the TFTs may be made of polysilicon. In such a configuration, it is preferable that bottom-gate type TFTs are used.

(14) In each of the above embodiments, the touchscreen pattern uses the self-capacitance method. However, a touch screen pattern that uses a mutual-capacitance method may be used.

(15) The transmissive liquid crystal panel is described in each of the above embodiment sections. However, the technology described herein may be applied to reflective liquid crystal panels and semitransmissive liquid crystal panels.

(16) The liquid crystal display device having the horizontally-long rectangular shape in the plan view is described in each of the above embodiment sections. However, the technology described herein may be applied to liquid crystal display devices having vertically-long rectangular shapes, square shapes, circular shapes, semicircular shapes, oval shapes, and trapezoidal shapes.

(17) The liquid crystal panel including the liquid crystal layer sandwiched between the substrate is described in each of the above embodiments. However, the technology described herein may be applied to display panels each including functional organic molecules other than the liquid crystals sandwiched between the substrates.

(18) The sequence of the layers of the drain electrodes of the TFTs and the pixel electrodes on the gate insulating film is not limited to that of the above embodiments. The drain electrodes of the TFTs may be disposed above the pixel electrodes or the pixel electrodes may be disposed above the drain electrodes.

The invention claimed is:

1. A display device with a position inputting function comprising:
    pixel electrodes;
    signal lines configured to transmit signals supplied to the pixel electrode and disposed to sandwich the pixel electrodes;
    position detection electrodes each configured to form capacitors between the position detection electrodes and a position input member and to detect a position of input by the position input member; and
    a position detection line comprising at least:
        first line portions each sandwiched between the pixel electrodes and the signal lines; and
        a second line portion bridging the first line portions.

2. The display device according to claim 1, wherein
    the signal lines and the position detection line are arranged in a first direction,
    the pixel electrodes are linearly arranged in a second direction perpendicular to the first direction,
    pairs of the first line portions are linearly arranged in the second direction,
    the first line portions and the second line portion are constructed from a metal film,
    the position detection line further comprises a third line portion constructed from the metal film from which the first line portions and the second line portion are constructed, and
    the third line connects the first line portions adjacent in the second direction with each other.

3. The display device according to claim 1, wherein
    the signal lines and the position detection line are arranged in a first direction,
    the pixel electrodes are linearly arranged in a second direction perpendicular to the first direction,
    pairs of the first line portions are linearly arranged in the second direction,
    the display device further includes an insulating film with contact holes, and
    the display device further comprises:
        switching components disposed adjacent to the pixel electrodes with respect to the second direction and including first ends connected to the signal lines and second ends connected to the pixel electrodes; and
        switching component bridging lines disposed to cross the switching components and including portions connected to the first line portions adjacent in the second direction through the contact holes of the insulating film, wherein
    the insulating film is disposed between the switching components and the switching component bridging lines.

4. The display device according to claim 1, wherein
    the pixel electrodes and the position detection line are disposed in a same layer,
    the first wiring portions of the position detection wiring include first ends connected to the second wiring portion and second ends opposite from the first ends,
    the display device further includes an insulating film with contact holes, and
    the display device further comprises pixel electrode bridging wirings disposed to cross the pixel electrodes and including portions connected to the second ends of the first wiring portions through the contact holes of the insulating film.

5. The display device according to claim 3, wherein
    the switching component bridging wirings are disposed in a layer in which the position detection electrodes are disposed, and
    the insulating film includes position detection contact holes through which the position detection wiring is connected to the position detection electrodes.

6. The display device according to claim 1, wherein
    the signal wirings and the position detection wiring are arranged in a first direction,
    the pixel electrodes are arranged in the second direction perpendicular to the first direction,
    the signal wirings extend to sandwich the pixel electrodes linearly arranged in the second direction,
    the display device further comprises the switching components disposed adjacent to the pixel electrodes in the second direction and including first ends connected to the signal wirings and second ends connected to the pixel electrodes, wherein
    the switching components include:
        first switching components disposed closer to first edges of the pixel electrodes with respect to the first direction, wherein each of the first switching components is connected to one of the pixel electrodes adjacent in the second direction and one of the signal wirings; and
        second switching components disposed closer to second edges of the pixel electrodes with respect to the first direction, wherein each of the second switching components is connected to another one of the pixel electrodes adjacent in the second direction and another one of the signal wirings.

7. The display device according to claim 6, further comprising switching component bridging wirings disposed to cross the switching components, wherein the display device further includes an insulating film between the switching component and the switching component bridging wirings, the insulating film includes contact holes, the switching component bridging wirings include portions connected to the first wiring portions adjacent in the second direction through the contact holes of the insulating film, the first wiring portions include first-side first wiring portions and second-side first wiring portions separated from each other in the first direction, the first-side first wiring portions are linearly arranged in the second direction, the second-side first wiring portions are linearly arranged in the second direction, the first wiring portions and the second wiring portions are constructed from a metal film, the position detection wiring further comprises third wiring portions constructed from the metal film from which the first wiring portions and the second wiring portion are constructed, wherein the third wiring portions connect the first wiring portions with each other, the third wiring portions are disposed not to overlap the first switching components and the second switching components, the switching component bridging wirings include:
first switching component bridging wirings disposed to overlap the first switching components; and
second switching component bridging wirings disposed to overlap the second switching components, the third wiring portions include:
first-side third wiring portions each connecting the first-side first wiring portions; and
second-side third wiring portions each connecting the second-side first wiring portions.

8. The display device according to claim 6, further comprising switching component bridging wirings disposed to cross the switching components, wherein the display device further includes an insulating film between the switching components and the switching component bridging wirings, the insulating film includes contact holes, the switching component bridging wirings include portions connected to the first wiring portions adjacent in the second direction through the contact holes of the insulating film, the position detection wiring comprises:
the first wiring portions include first-side first wiring portions and second-side first wiring portions separated from each other in the first direction, the first-side first wiring portions are linearly arranged in the second direction, the second-side first wiring portions are linearly arranged in the second direction, the first wiring portions and the second wiring portions are constructed from a metal film, the position detection wiring further comprises third wiring portions constructed from the metal film from which the first wiring portions and the second wiring portion are constructed, wherein the third wiring portions connect the first wiring portions with each other, the third wiring portions are disposed not to overlap the first switching components and the second switching components, the switching component bridging wirings are disposed to overlap the first switching components but not the second switching components, and the third wiring portions are disposed to connect the first-side first wiring components with each other.

9. The display device according to claim 1, wherein the signal wirings and the position detection wiring are disposed in a same layer.

10. The display device according to claim 1, wherein the signal wirings and the position detection wiring are disposed in a layer in which the pixel electrodes are disposed.

* * * * *